(12) United States Patent
Paterson et al.

(10) Patent No.: US 6,412,042 B1
(45) Date of Patent: Jun. 25, 2002

(54) SYSTEM AND METHOD FOR IMPROVED DISK DRIVE PERFORMANCE AND RELIABILITY

(75) Inventors: R. Hugo Paterson; Daniel Stodolsky, both of Mountain View, CA (US); Satish Rege, Groton, MA (US); Frederic R. Carlson, Jr., Los Gatos, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/442,113

(22) Filed: Nov. 17, 1999

(51) Int. Cl.⁷ .............................................. G06F 12/00
(52) U.S. Cl. ....................................... 711/112; 711/162
(58) Field of Search .............................. 360/47; 714/6; 711/111, 112, 161, 162

(56) References Cited

U.S. PATENT DOCUMENTS

| | | | |
|---|---|---|---|
| 3,729,725 A | 4/1973 | Denney et al. ............. 340/174 |
| 3,761,903 A | 9/1973 | Bird et al. .................. 340/174 |
| 3,848,262 A | 11/1974 | Belcastro ..................... 360/60 |
| 4,302,783 A | 11/1981 | Mima et al. .................. 360/47 |
| 4,328,580 A | 5/1982 | Stockham et al. ............. 371/8 |
| 4,573,084 A | 2/1986 | Iida et al. .................... 358/300 |
| 4,630,140 A | 12/1986 | Sugimura et al. ............. 360/49 |
| 4,636,877 A | 1/1987 | Ido .............................. 360/51 |
| 4,814,903 A | 3/1989 | Kulakowski et al. ......... 360/48 |
| 4,890,179 A | 12/1989 | Baker .......................... 360/132 |
| 4,903,198 A | 2/1990 | Iwasaki ....................... 364/200 |
| 5,031,218 A | 7/1991 | Galand et al. ................ 381/46 |
| 5,162,954 A | 11/1992 | Miller et al. ................ 360/72.2 |
| 5,390,313 A | 2/1995 | Yanai et al. ................. 395/425 |
| 5,392,290 A | 2/1995 | Brown et al. .............. 271/10.1 |
| 5,408,368 A | 4/1995 | Hallamasek ............... 360/72.2 |
| 5,422,761 A | 6/1995 | Anderson et al. ............. 360/47 |
| 5,479,391 A | 12/1995 | Horibe et al. ................. 369/60 |
| 5,636,078 A | 6/1997 | Tsai et al. .................. 360/72.1 |
| 5,819,100 A | 10/1998 | Pearce ................... 395/750.05 |

*Primary Examiner*—Kevin Verbrugge
(74) *Attorney, Agent, or Firm*—Michael Zarrabian

(57) ABSTRACT

A data recording device including recording media having a set of at least two alternate regions thereon for each data segment, whereby each data segment has a corresponding set of at least two alternate regions on the recording media; a transducer positionable to write data on and read data from the recording media; and a controller for recording one or more data segments on the recording media in response to one or more write commands, the controller including a selector wherein for each of said one or more data segments the selector selects one region from the set of alternate regions corresponding to that data segment and positions the transducer to write that data segment on the selected region. To reduce the access time for each write operation, the selector selects the one region from the set of alternate regions based on shortest access time required to access each of the regions in the set of alternate regions for recording data.

105 Claims, 16 Drawing Sheets

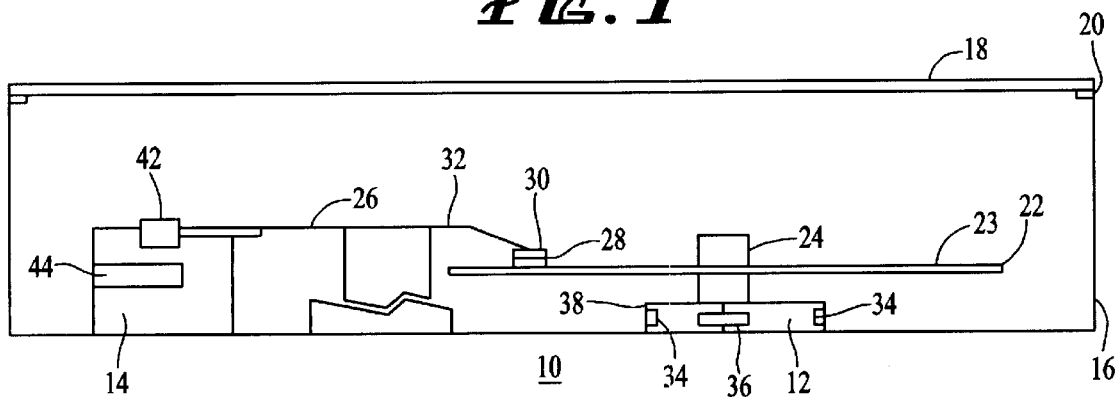
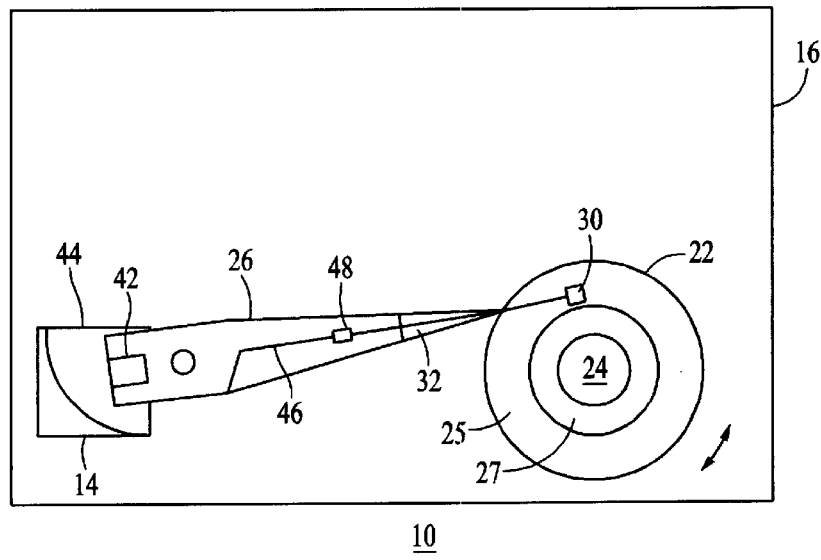

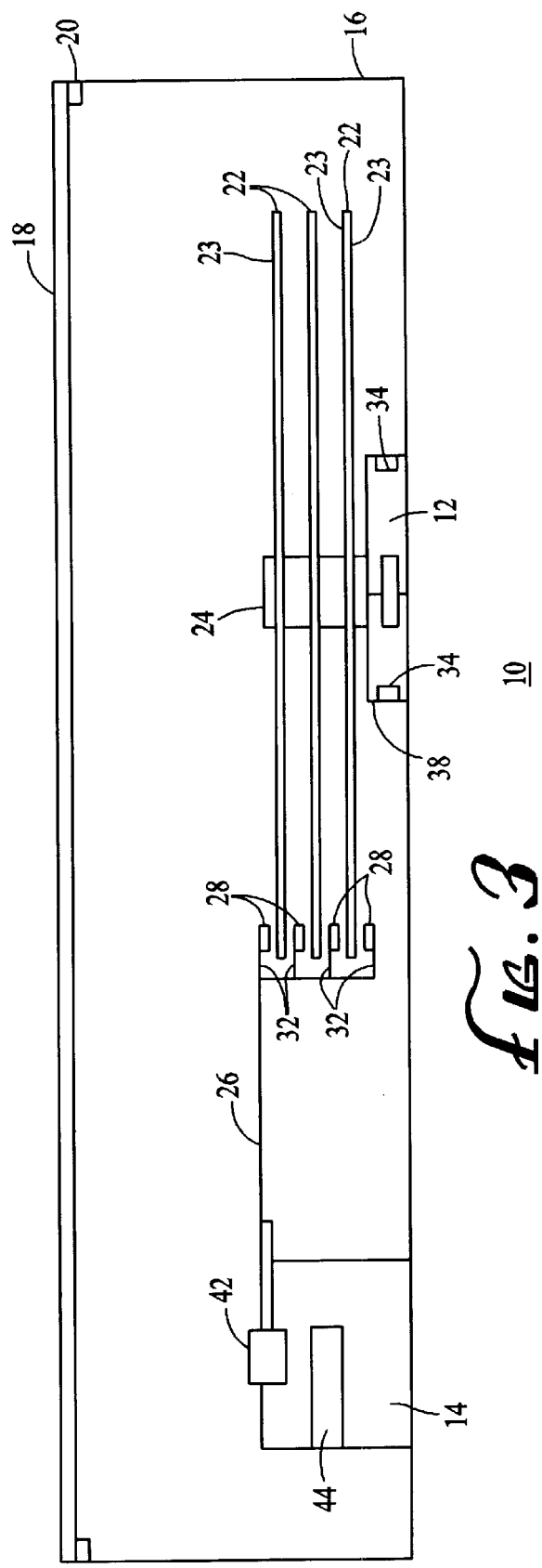

ORIGINAL SECTOR LAYOUT

REPLICA SECTOR LAYOUT

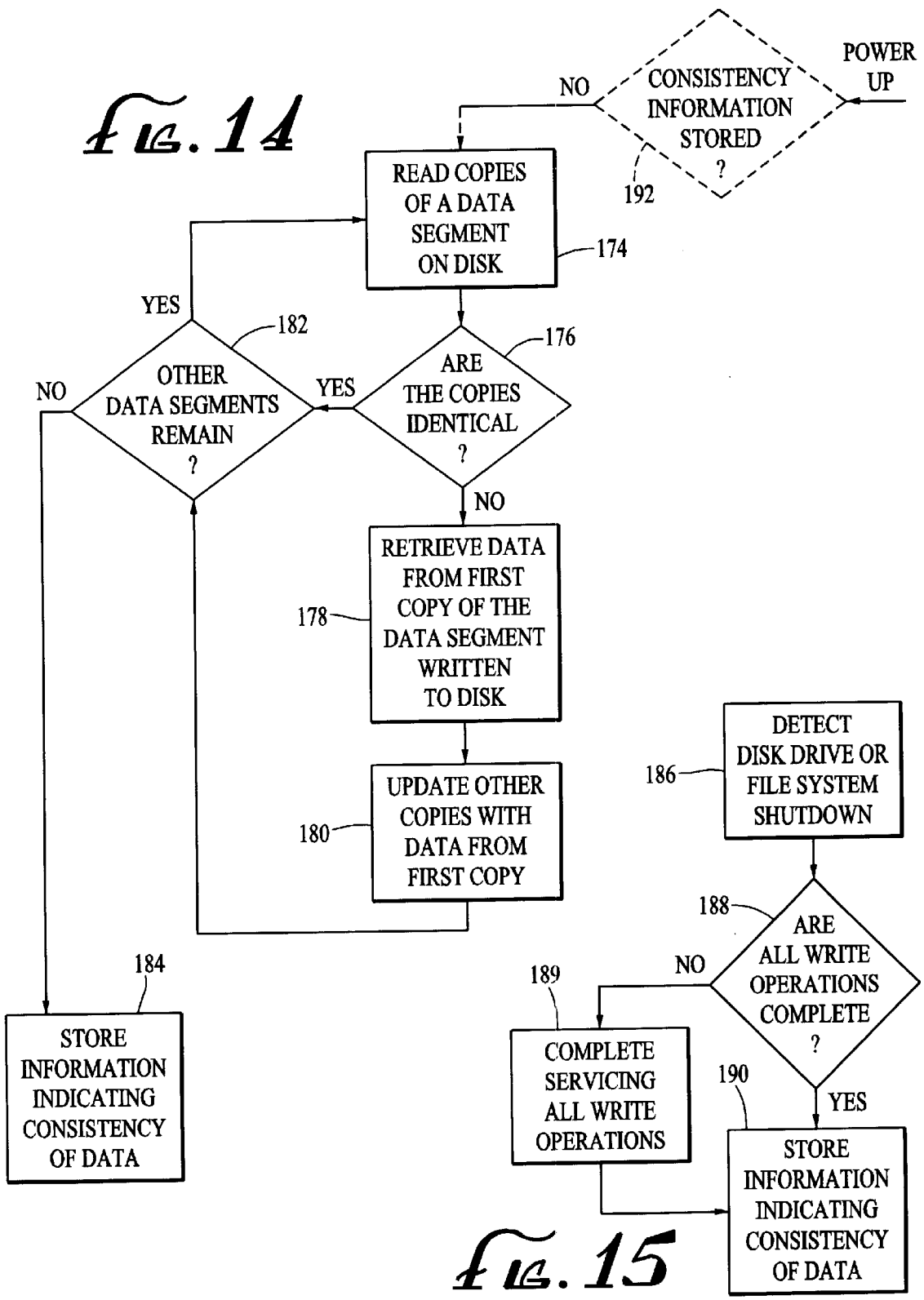

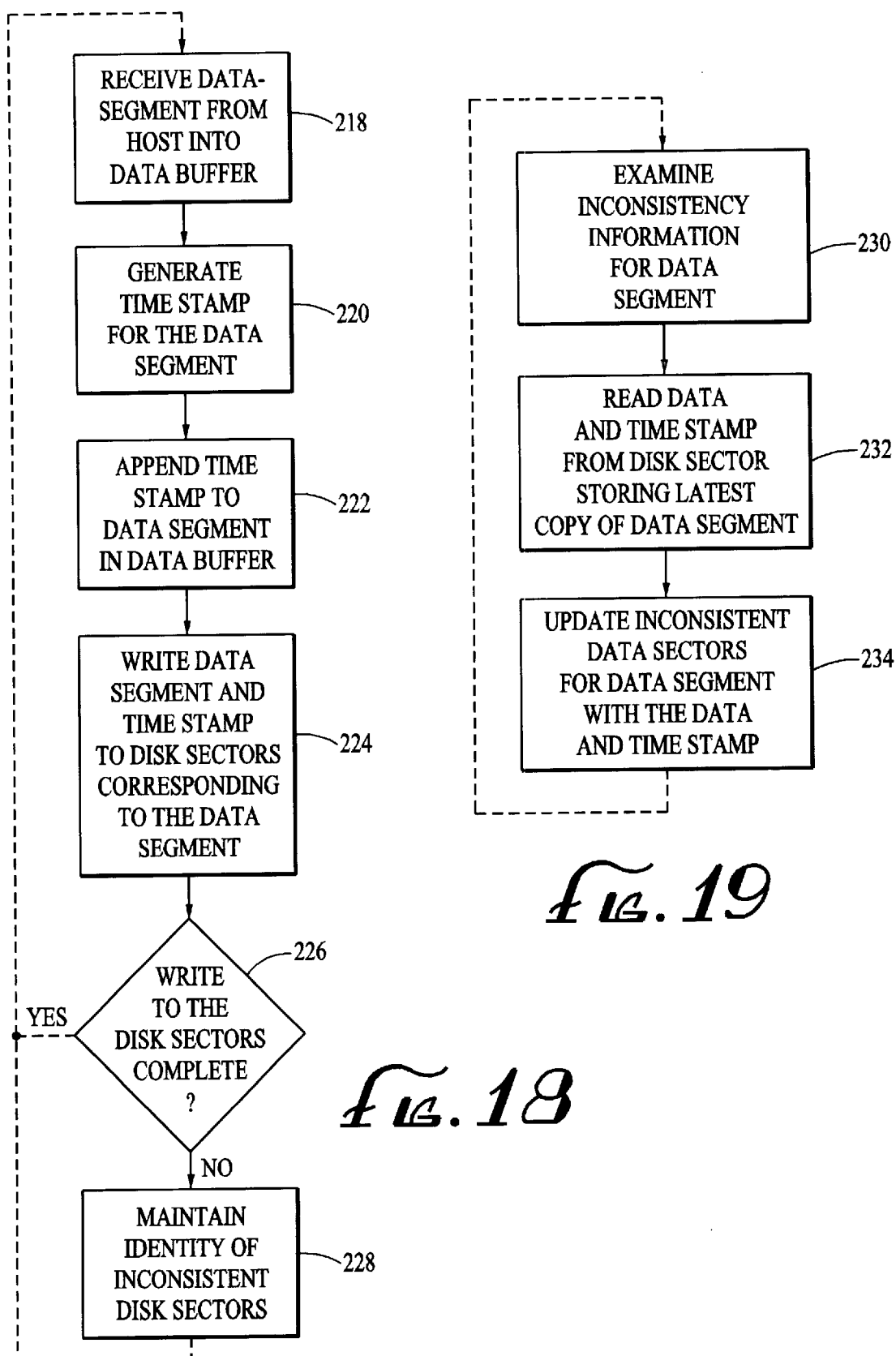

| fig. 20-1 |
| fig. 20-2 |

SYSTEM AND METHOD FOR IMPROVED DISK DRIVE PERFORMANCE AND RELIABILITY

FIELD OF THE INVENTION

The present invention relates to disk drive data storage systems and more particularly, to disk drive systems with improved reliability, data consistency and reduced latency for storing and retrieving data.

BACKGROUND OF THE INVENTION

Disk drives are utilized in many information and processing systems for storing data. A typical disk drive includes a spindle motor for rotating a data disk, and an actuator for moving a head carrier that supports read/write heads radially across the disk to write data to or read data from concentric data tracks on the disk. Many disk drives include a plurality of disks separated by spacer rings and stacked on a hub attached to the spindle motor, a plurality of read/write heads, and a plurality of head carriers, each head carrier supporting at least one read/write head.

To access a data segment on a track, in a seek operation the head is moved radially across the tracks to a desired track where the data segment resides. Thereafter, the rotation of the disk rotates the data segment on the track under the head for writing data to or reading data therefrom. The amount of time required for accessing a data segment, or access time, includes the time spent for the seek operation in positioning a head over a track, and a rotational latency which is the time for the data segment on the track to rotate under the head.

To reduce the access time, some disk drive systems include one head per track, in which case there is no need for a seek operation to move a head across the data tracks. This reduces the seek time to zero. However, such systems are expensive to build, maintain and operate. Further, in such systems the speed of accessing a data segment on a track is still limited by the rotational latency of the desired data segment on a track to rotate under the head for that track.

To reduce the rotational latency, some conventional disk drive systems utilize multiple transducers and/or redundant recording on the same or different tracks. In one such system, two transducer heads are utilized which write in separate regions or tracks of a disk. After a first transducer head writes data in a region of the disk, a second transducer head writes the same data in a second region of the disk delayed by 180 degrees of rotation to assure that the beginning of the redundant data is displaced 180 degrees. By delaying the initiation of the write operation on the second track for one-half a revolution of the regions, access time equal to a two head per track system is obtained. For a read operation, one of the heads closer to the data is selected in any suitable manner to do the reading.

However, a disadvantage of such systems is the need for two heads to address each track to reduce said rotational latency for reading data. Another disadvantage of conventional disk drives utilizing replication is lack of effective mechanisms for ensuring data consistency between replicated data. For example, such systems do not provide a mechanism for ensuring data consistency between replicated data across power fails. When such disk drives lose power after writing a first copy of data to a first region of the disk, but before writing the second copy of the same data to a second region of the disk, the copy of data in the first region is inconsistent with preexisting data in the second region of the disk. This is because when the disk drive loses power after writing a first copy of the data, it also loses memory and therefore loses track of the duplication process.

When power is restored, the disk drive is incognizant that duplication is only partially complete. Further, after powerup the disk drive can be completely incognizant that data duplication was in progress before power loss, and as such all knowledge of the data blocks to be duplicated is lost. Thereafter, in satisfying a read request for said written data, the disk drive is unaware that only said first region contains the requested data and that the second region contains the preexisting data. Since the read operation retrieves data from one of said two regions with the shortest rotational latency, if the second region has a shorter rotational latency than the first region, then the preexisting and erroneous data is retrieved instead of the requested data contained in the first region.

Another disadvantage of conventional disk drives with data duplication is significant rotation latency in writing data. In many computing systems, performance is limited by the rate at which small blocks of data can be written to a disk drive. Transaction processing systems, for example, typically dedicate a disk drive to holding log data, and the throughput of the system is limited by the number of small writes that the log disk drive can perform. In desktop systems, the time to write a page of virtual memory out to a paging region of a data disk has a substantial impact on performance of the system. Although, conventional disk drives utilizing data replication can reduce the rotational latency for read operations, each replication increases the amount of time for completing a write operation. This substantially degrades the throughput of such systems.

In storage systems which include multiple disk drives, reliability of the storage systems can be improved by storing the same data on two or more disk drives. However, many storage systems utilize a single disk drive for storing data. Such disk drives use a per-written sector error-correcting code to tolerate and correct read-back errors caused by environmental conditions and channel noise. However, significant classes of errors such as thermal asperities and media wear cause multiple contiguous blocks in a row to become permanently unreadable. In some cases an entire drive surface may become unavailable. Additionally, frequently transient conditions such as vibration and inadequate read/write head settling cause a read request to fail.

Although error correction codes can correct many of such errors, a read request must sometimes be repeated to retrieve the correct data, thereby prolonging the read rotational latency for an additional revolution of the disk where the data resides. This leads to substantial variation in read response time, reducing the suitability of the disk drive for real-time applications such as video broadcast or robotic control. Further, in some conventional disk drives, when a sector read fails, the disk drive engages in "heroic recovery", wherein the disk drive retries the read under a variety of conditions in an attempt to recover the data. Heroic recovery can take as long as 30 seconds, leading to significant response time and throughput delays.

There is, therefore, a need for a disk drive which ensures data consistency between replicated data. There is also a need for such a disk drive with reduced rotation latency for writing data. There is also a need for such a disk drive to reduce the frequency with which a read operations fail to return the previously written data. There is also a need for such a disk drive to reduce variation in response time for successful reads. There is also a need for such a disk drive to reduce the time spent in heroic recovery without reducing data reliability. There is also a need for such a disk drive to reduce read rotational latency.

BRIEF SUMMARY OF THE INVENTION

The present invention satisfies these needs. In one embodiment, the present invention provides a data recording device for storing a plurality of data segments therein. The data recording device comprises recording media; transducing means positionable to write data on and read data from the recording media; means for designating a set of at least two alternate regions on the recording media for each data segment, whereby each data segment has a corresponding set of at least two alternate regions on the recording media; and a controller for recording one or more data segments on the recording media in response to one or more write commands. The controller includes selection means wherein for each of the one or more data segments, the selection means selects one region from the set of alternate regions corresponding to that data segment and positions the transducing means to write that data segment on the selected region. To reduce the access time for each write operation, the selection means selects the one region from the set of alternate regions based on shortest access time required to access each of the regions in the set of alternate regions for recording data.

To provide data reliability across power fails, the controller further includes indicator means for maintaining chronological information identifying the relative order of recording each data segment on a region selected from the set of alternate regions corresponding to that data segment. For each data segment, the indicator means records chronological information on the region selected from the set of alternate regions corresponding to that data segment to allow identification of the relative order of recording that data segment therein. The controller further includes retrieval means for retrieving a data segment recorded on the media. The retrieval means first examines the chronological information for each region of the set of alternate regions corresponding to that data segment in order to locate a region therein which stores a most recent recording of the data segment, and then accesses the located region to retrieve the data segment therefrom.

In another embodiment of the data recording device, the controller includes replicating means for recording data segments on the recording media a multiplicity of times. In response to a command to write a data segment on the recording media, the replicating means records the data segment on the recording media a multiplicity of times at out of phase regions in a designated order. Each data segment has a corresponding set of out of phase regions on the recording media, whereby data recorded in a first region in order of the set of out of phase regions for each corresponding data segment comprises a most recent copy of the data segment. The controller further includes retrieval means for retrieving data segments recorded on the recording media. In response to a command to read a data segment written on the media a multiplicity of times, in a first mode of operation the retrieval means selectively accesses one of said out of phase regions requiring shortest access time to read data therefrom, and in a second, alternative mode of operation the retrieval means selectively accesses said first region to read data therefrom.

A verification means verifies that for at least one data segment, data in the first region of the set of out of phase regions corresponding to the at least one data segment is consistent with data in each remaining region of the set of out of phase regions. Further, if data in one or more of the remaining regions is inconsistent with data in the first region, an updating means updates the data in the one or remaining regions with data consistent with data in said first region.

Another indicator means maintains inconsistency information for each data segment recorded on the recording media, wherein the inconsistency information for a data segment identifies regions among said corresponding out of phase regions which do not include identical copies of that data segment. The inconsistency information is used to update the inconsistent regions such that a retrieval means can select a region with shortest access time among a set of regions for a data segment for reading data therefrom.

To improve data reliability and performance of the data recording device, if an error occurs in reading data from one region of the multiple regions for each data segment, the controller accesses another region of the multiple regions to read data therefrom. Further, in one version of the data recording device, data is recorded on the media in parallel tracks such that the distance between adjacent tracks on the recording media is reduced to levels at which data can be recorded at an acceptable adjacent track overwrite rate. In another version, data is recorded on the media such that a time for the transducing means to settle over a track on the recording media is reduced to levels at which data can be recorded at an acceptable adjacent track overwrite rate.

In another aspect, the present invention provides a method and a control system for implementing the above features in a data recording device.

As such, a data recording device according to the present invention ensures data consistency between replicated data, reduces rotation latency for writing data, reduces the frequency with which a read operations fail to return the previously written data, reduces variation in response time for successful reads, reduces the time spent in heroic recovery without reducing data reliability, and reduce read rotational latency.

BRIEF DESCRIPTION OF THE DRAWINGS

These and other features, aspects and advantages of the present invention will become better understood with regard to the following description, appended claims and accompanying drawings where:

FIG. 3 shows a section view of an example schematic of an embodiment of a disk drive with multiple data disks according to the present invention;

FIG. 14 shows an example logical flowchart of the steps of an embodiment of a process implementing the present invention for verifying consistency between ordered copies of each data segment on data disks;

FIG. 15 shows an example logical flowchart of the steps of an embodiment of a process implementing the present invention for maintaining information indicating consistency of copies of each data segment on data disks;

FIG. 18 shows an example logical flowchart of the steps of an embodiment of a process implementing the present invention for maintaining information indicating consistency of copies of each data segment on data disks;

FIG. 19 shows an example logical flowchart of the steps of an embodiment of a process implementing the present invention for updating inconsistent copies of a data segment on data disks.

DETAILED DESCRIPTION OF THE INVENTION

Figures 1, 20:
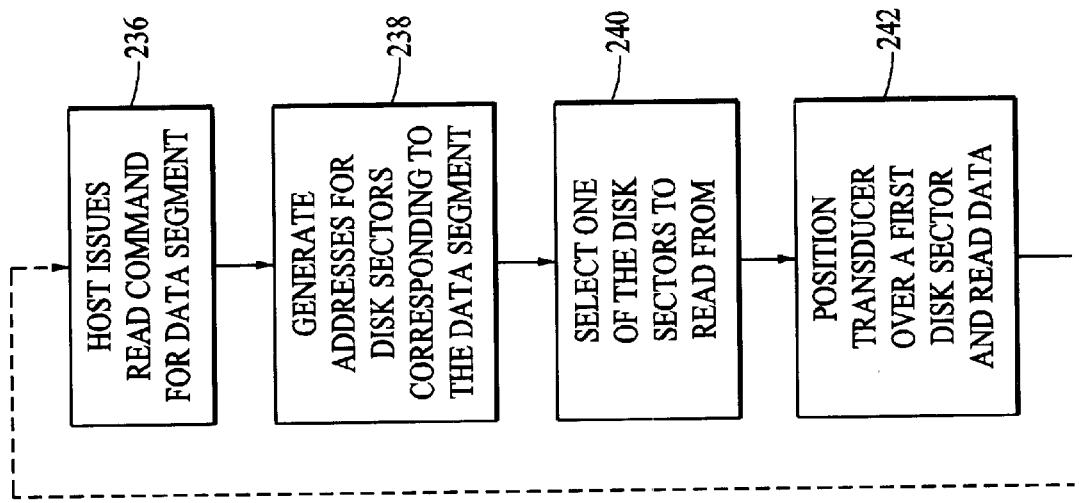
FIG. 1 shows a section view of an example schematic of an embodiment of a disk drive according to the present invention.
FIG. 20 shows an example logical flowchart of the steps of an embodiment of a process implementing the present invention for error recovery.
Figure 20:
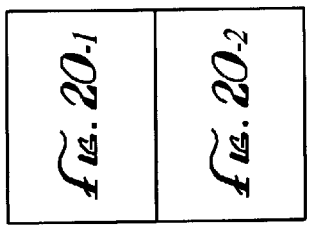
Figures 2, 20:
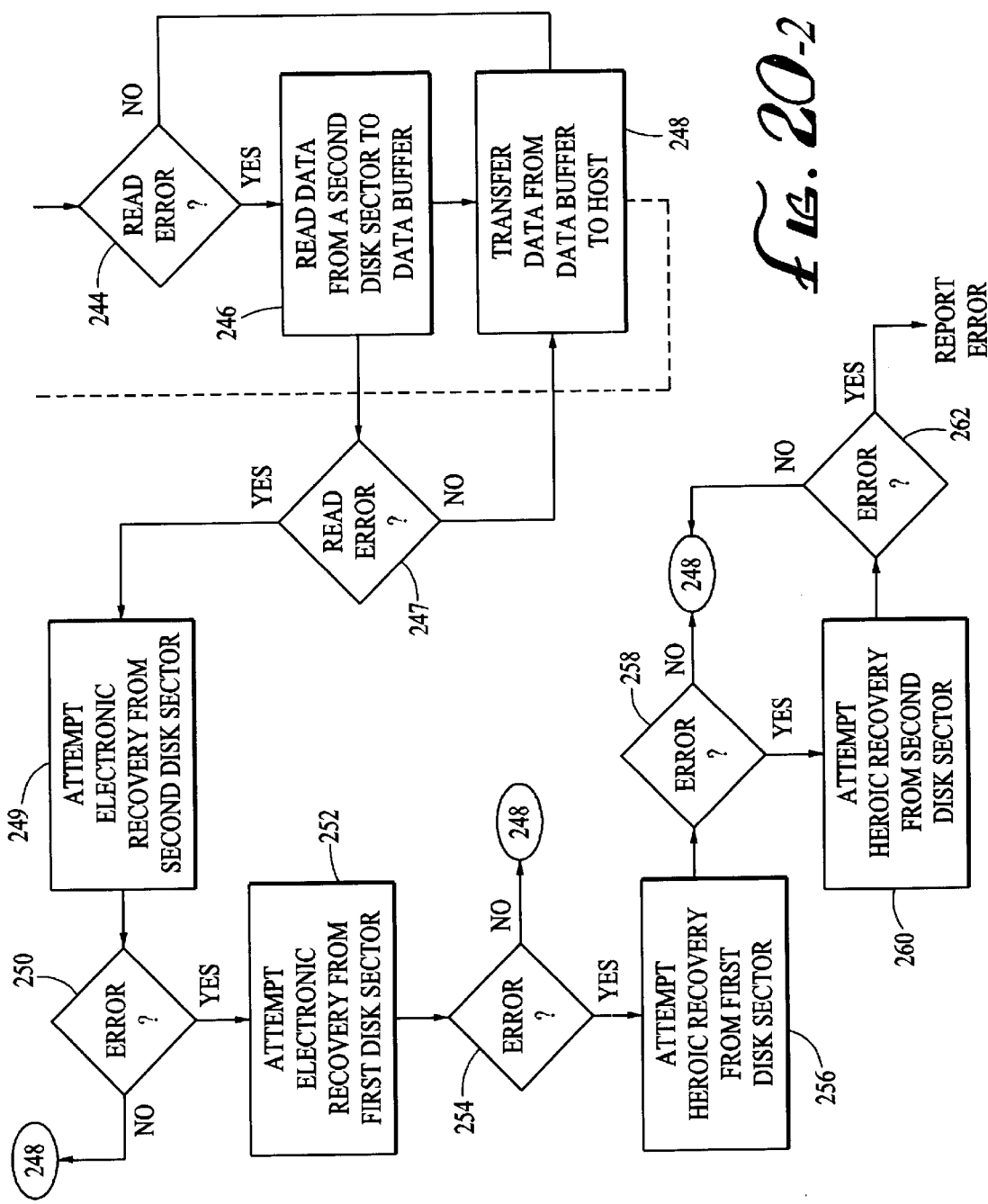
FIG. 2 shows an open top plan view of the disk drive of FIG. 1.

FIG. 1 shows a schematic section view of an embodiment of a disk drive 10 according to the present invention. The disk drive 10 comprises a spindle motor 12 (SPM) and an actuator 14 attached to a support 16 and covered by a cover 18. A sealing gasket 20 is placed between the cover 18 and the support 16 to provide a substantially sealed enclosure. FIG. 2 shows a top view of the disk drive 10 without the cover 18. A data disk 22 is secured to the spindle motor 12 via a hub 24 for rotating the disk 22 when the spindle motor 12 is powered. A head carrier arm 26 is attached to the actuator 14 for carrying a transducer or read/write head 28. Specifically, the transducer is carried on an air bearing slider 30 attached to a suspension 32 on the trailing end of the head carrier arm 26. The suspension 32 urges the slider 30 and the transducer 28 onto a surface 23 of the disk 22. The suspension 32 allows the slider 30 to pitch and roll as it rides on an air bearing on the surface 23 of the disk 22. The transducer 28 can be an inductive read and write transducer or an inductive write transducer with a magneto resistive read transducer formed by thin film deposition techniques.

The spindle motor 12 can comprise a brushless DC motor having multiple phase windings 34 arranged as a stator, and a rotor 36 having a permanent magnet or a DC current excitation winding for rotating the disk 22. The phase windings 34 are positioned in a fixed base casting 38, and the rotor 36 is rotatably disposed in the base casting 38. The permanent magnet can include a magnetic ring with north and south poles magnetized therein alternatively. Similarly, the DC excitation winding can include a set of windings positioned on the rotor 36 such that currents applied to the excitation windings create north and south poles alternately. Commutation of the spindle motor 12 is performed externally by application of currents to the phase windings 34 in sequential order to generate torque-inducing flux for moving the rotor 36.

The actuator 14 can comprise a rotary voice coil motor (VCM) having a coil or an excitation winding 42 that can move through a stationary magnetic field generated by magnets 44 when a current is applied to the coil or winding 42. The stationary magnetic filed can be provided by the permanent magnet assembly 44 or by excitation windings. To read data from or write data onto the disk 22, the spindle motor 12 rotates the disk 22 and the VCM 14 moves the head carrier arm 26 radially across the surface 23 of the disk 22, positioning the transducer 28 over different data tracks on the surface 23 of the disk 22.

The signals detected from the disk 22 by the transducer 28 flow through a flex cable 46 to a logic circuit 48 on the head carrier arm 26 for processing into data readback signals by signal amplification and processing logic. The data read back signals are routed via a cable for further processing. Referring to FIG. 3, in another embodiment the disk drive 10 can include a plurality of data disks 22 separated by spacer rings and stacked on the hub 24 attached to the spindle motor 12, a plurality of transducers 28, and a plurality of suspensions 32 attached to the head carrier arm 26. Data can be recorded on one surface 23 or the opposing surfaces 23 of one or more of the disks 22.

Figure 4:
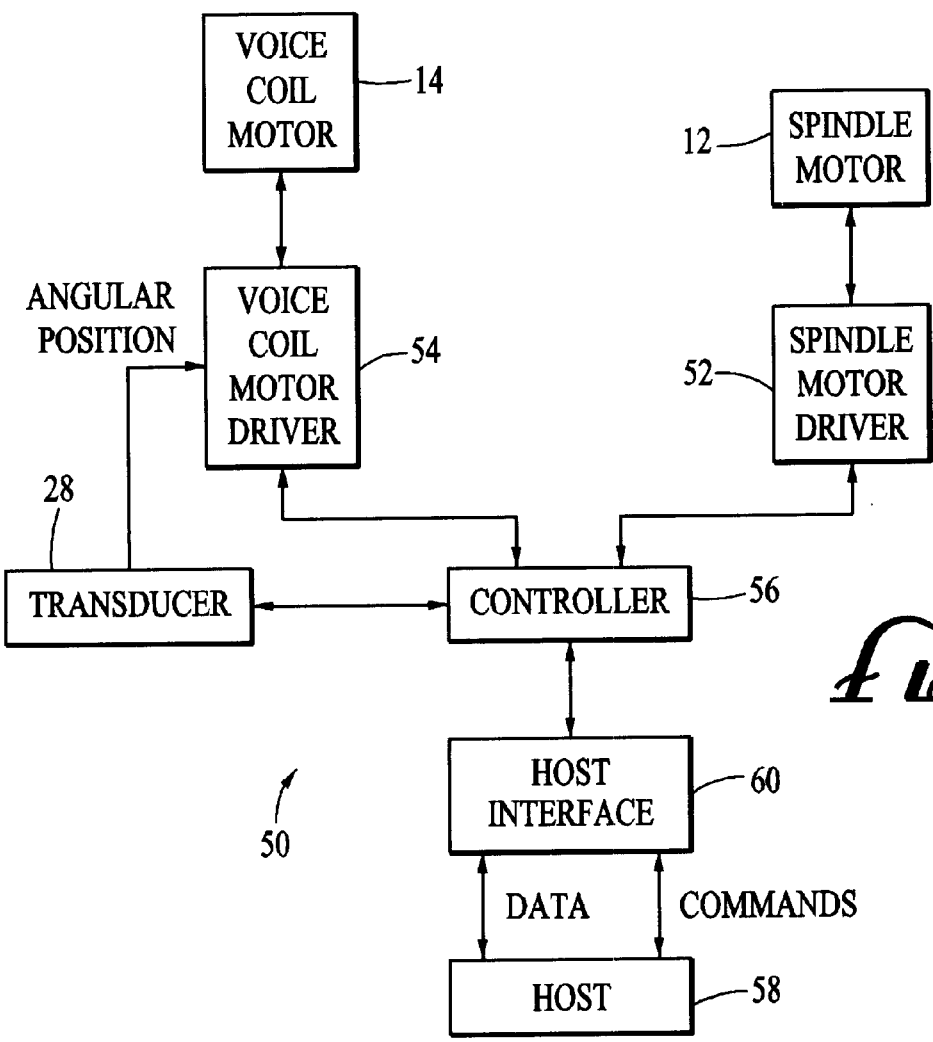
FIG. 4 shows a block diagram of an example architecture of an embodiment of a driver system for the disk drives of FIGS. 1 and 3.

Referring to FIG. 4, the disk drive 10 further includes a driver system 50 coupled to the spindle motor 12 and to the VCM 14 for general control of the disk drive 10. The driver system 50 includes a spindle motor driver 52 for commutating the spindle motor 12 and regulating the rotational speed of the data disks 22, and a VCM driver 54 for positioning the transducers 28 over selected tracks on the data disks 22. The driver system 50 further includes a controller 56 coupled to the VCM driver 54 and to the transducer 28 for recording data segments to, and retrieving data segments from, the disks 22 in response to write and read commands, respectively, from a host 58 via a host interface 60.

Figure 5:
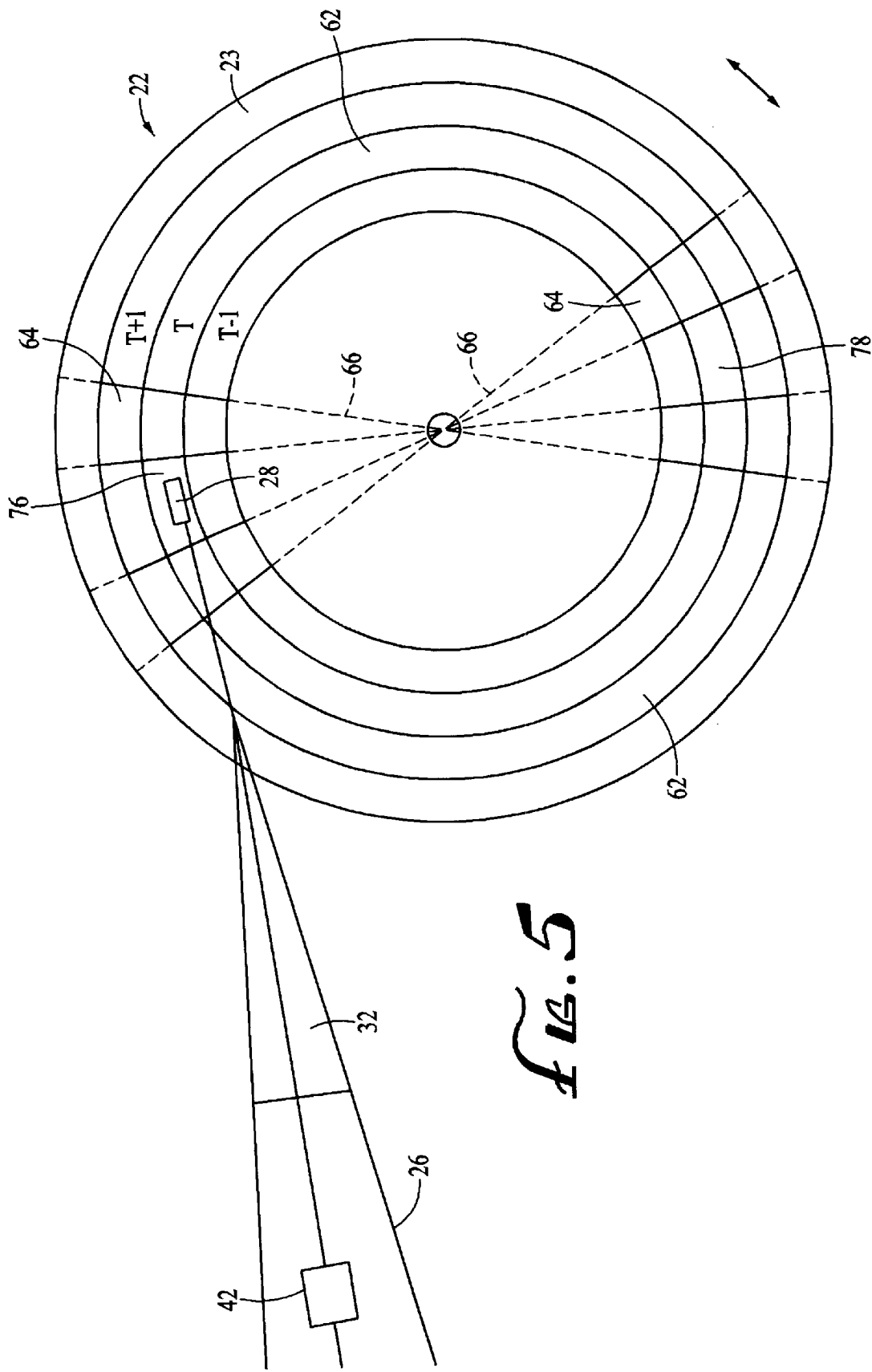
FIG. 5 is a partial detailed plan view of another example disk drive incorporating the present invention.

Referring to FIG. 5, in an example embodiment, a surface 23 of the disk 22 includes a plurality of tracks 62 identified as tracks 1 . . . T+1. The transducer 28 is shown positioned over a track T of said plurality of tracks 62. Each track 62 is partitioned into a plurality of regions or disk sectors 64 by a number of servo fields 66. The servo fields 66 can serve as position indicators to provide the rotational position of the disk 22 with respect to the transducer 28. The angular or radial position of the transducer 28 over the disk 22 can be sensed from the servo fields 66 and utilized as tracking information by the VCM driver 54 to maintain the transducer 28 over a selected track 62.

Figure 6A:
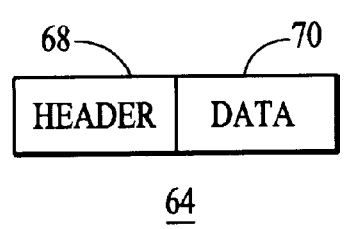
FIG. 6A shows a block diagram of an example disk sector.
Figure 6B:
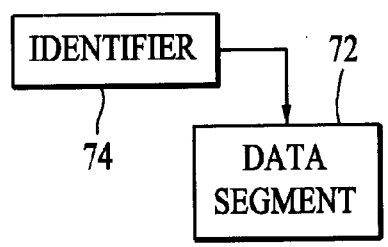
FIG. 6B shows a block diagram of an example data segment and corresponding identifier.

Referring to FIG. 6A, in one embodiment each disk sector 64 comprises a header portion 68 which includes identification of: (1) the disk sector 64, (2) the number of a track 62 where the disk sector 64 resides, and (3) the disk 22 and disk surface 23 where the track 64 is located. Each disk sector 64 further comprises a data portion 70 for storing a data segment from the host 58 thereon. The data portion 70 can further include error correction information such as e.g. error correcting codes, CRC or checksums. Referring to FIG. 6B, in one embodiment each data segment 72 has an identifier 74 for uniquely identifying the data segment 72.

In routine recording of data segments 72 in conventional disk drives, typically for each data segment 72 there is a track number and a disk sector number on the track where that data segment 72 is recorded. As such, in such disk drives each data segment 72 is mapped to one physical disk sector 64. In a disk drive 10 according to the present invention, for each data segment 72 there are at least two disk sectors 64 where the data segment 72 can be stored. Each disk sector 64 has a track number and sector number on a track 62 associated therewith. The physical disk sectors 64 always exist on the surface 23 of the disk 22, and in one embodiment of the invention data segments 72 are mapped to the physical disk sectors 64 at setup or configuration time, and the mapping is thereafter static.

The identifier 74 of each data segment 72 is used to generate the addresses or locations of at least two disk sectors 64 where the data segment 72 can be stored. The identifier 74 can be processed by using a lookup table which includes at least two disk sector addresses for each data segment identifier. The look-up table can reside on the disk 22 and can comprise a sparse table including a plurality of entries each of which specifies the physical location of a set of tracks 62 on the disk surface 23. For example, an entry can specify that tracks 1 to 1,000,000 start at a first physical location on the disk 22, and the identifier 74 of a data segment 72 to be written is utilized to compute addresses of two disk sectors 64 on the disk 22 where that data segment 72 can be stored. In another embodiment, as the controller 56 receives a command from the host 58 to write a data segment 72 to the disk 22, the addresses of two disk sectors 64 where the data segment 72 can be stored are computed. As such, each data segment 72 has a corresponding set of at least two disk sectors 64 where that data segment 72 can be stored.

Figure 7A:
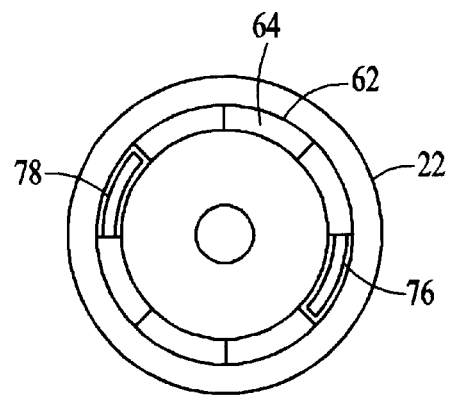
FIG. 7A shows two example disk sectors on the same track on an example data disk for storing a data segment according to the present invention.
Figure 7B:
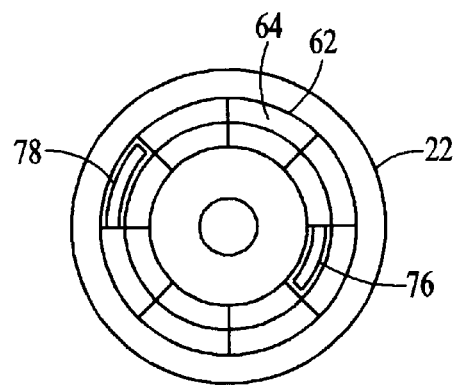
FIG. 7B shows two example disk sectors on the different tracks on an example data disk for storing a data segment according to the present invention.
Figure 7C:
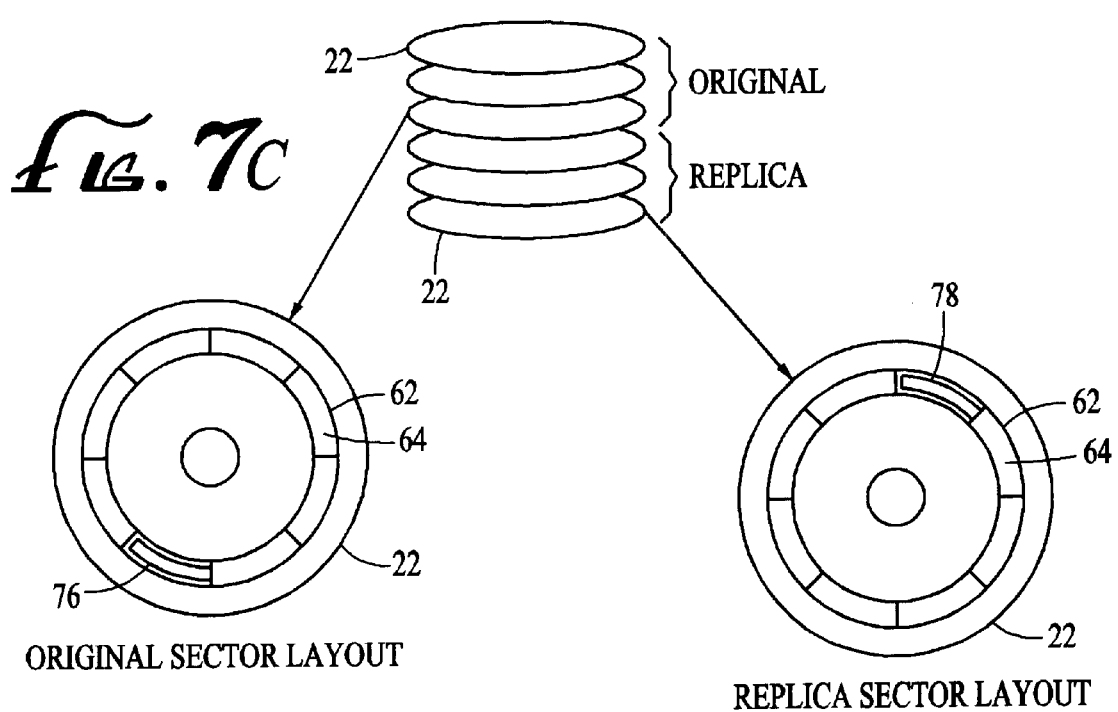
FIG. 7C shows two example disk sectors on different example data disks for storing a data segment according to the present invention.

The set of disk sectors 64 corresponding to a data segment 72 can be on the same or different disks 22 as shown by example in FIGS. 7A–7C. In FIG. 7A, a set of two disk sectors 76 and 78 corresponding to the data segment 72 can be on the same track 62 on one surface of a disk 22. Further, as shown in FIG. 7B, the set of disk sectors 76, 78 can be on different tracks 62 on the same surface of the disk 22, or on opposing surfaces of the same disk 22. In disk drives having multiple disks 22, each of the disk sectors 76, 78 can be on the same surface of one disk, on opposing surfaces of the same disk, or on surfaces of different disks 22 as shown in FIG. 7C.

In the following description the disk 22 is referenced in a singular manner for simplicity of description only. Further, each data disk 22 may also be known as a "platter" in the art. As detailed above, it is to be understood that according to the present invention disk sectors corresponding to a data segment can be on the same surface, or on the opposing surfaces, of one disk 22 as shown by example in FIGS. 5, 7A and 7C, or on different disks 22 as shown by example in FIGS. 3 and 7C. Further for simplicity of description, in the following description each data segment 72 has a set of two designated disk sectors 64 (e.g., 76 and 78) for storing that data segment 72. However, it is to be understood that according to the present invention, each data segment 72 can have two or more designated disk sectors 64 where that data segment 72 can be stored.

Figure 8:
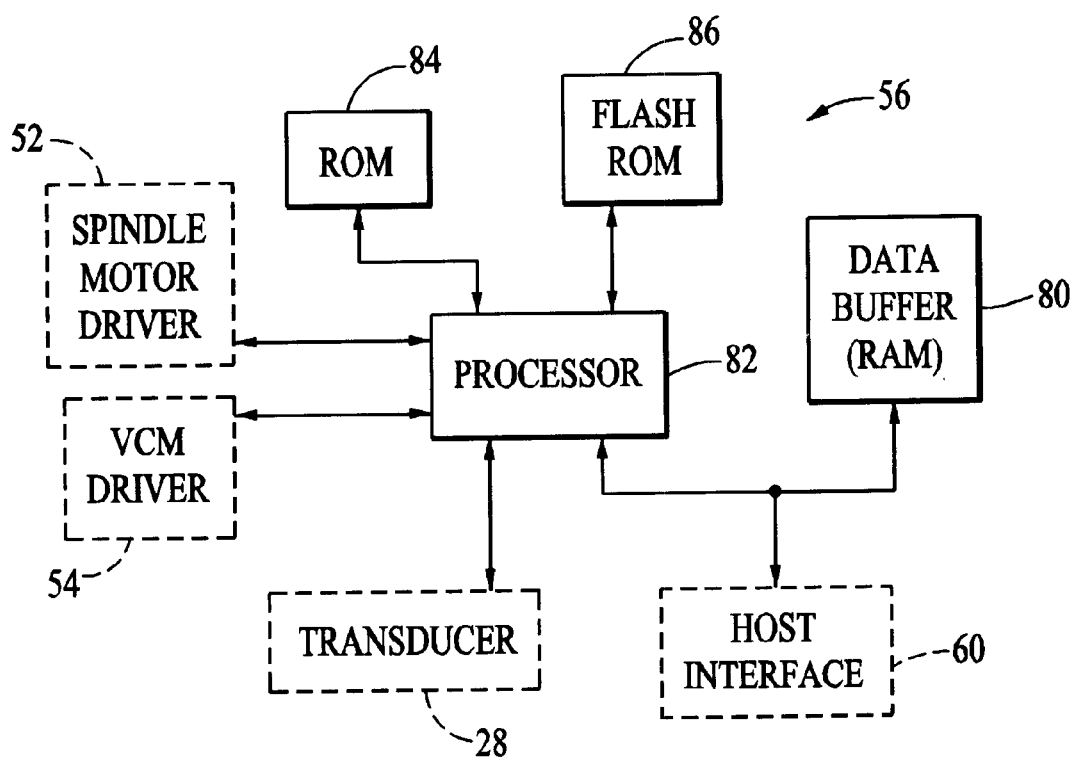
FIG. 8 shows a block diagram of an example architecture of an embodiment of the controller of the driver system of FIG. 4.

FIG. 8 shows an example block diagram of the architecture of an embodiment of the controller 56 of FIG. 4. The controller 56 comprises a data buffer 80 including random access memory (RAM) for buffering data transfer between a disk 22 via the transducer 28 and the host 58 via the host interface 60, and a processor 82 for controlling data transfer between the disk 22 and the host 58 through the data buffer 80. The controller 56 can further comprise non-volatile memory such as read only memory (ROM) 84 and Flash ROM 86. The ROM 84 stores program instructions for execution by the processor 82 to perform processes of the present invention as described below.

The Flash ROM 86 can store information to maintain integrity of data on the disk 22 in case of power loss while writing data to the disk 22. Said information can include the state of data transfer operations between the host 58 and the disk 22 and the state of data on the disk 22, including redundant data, data consistency information, and chronological information such as time stamps. The processor 82 can further be interconnected to the spindle motor driver 52 and the VCM driver 54 for controlling rotational speed of the disk 22 and the positioning of the transducer 28, respectively.

Figure 9:
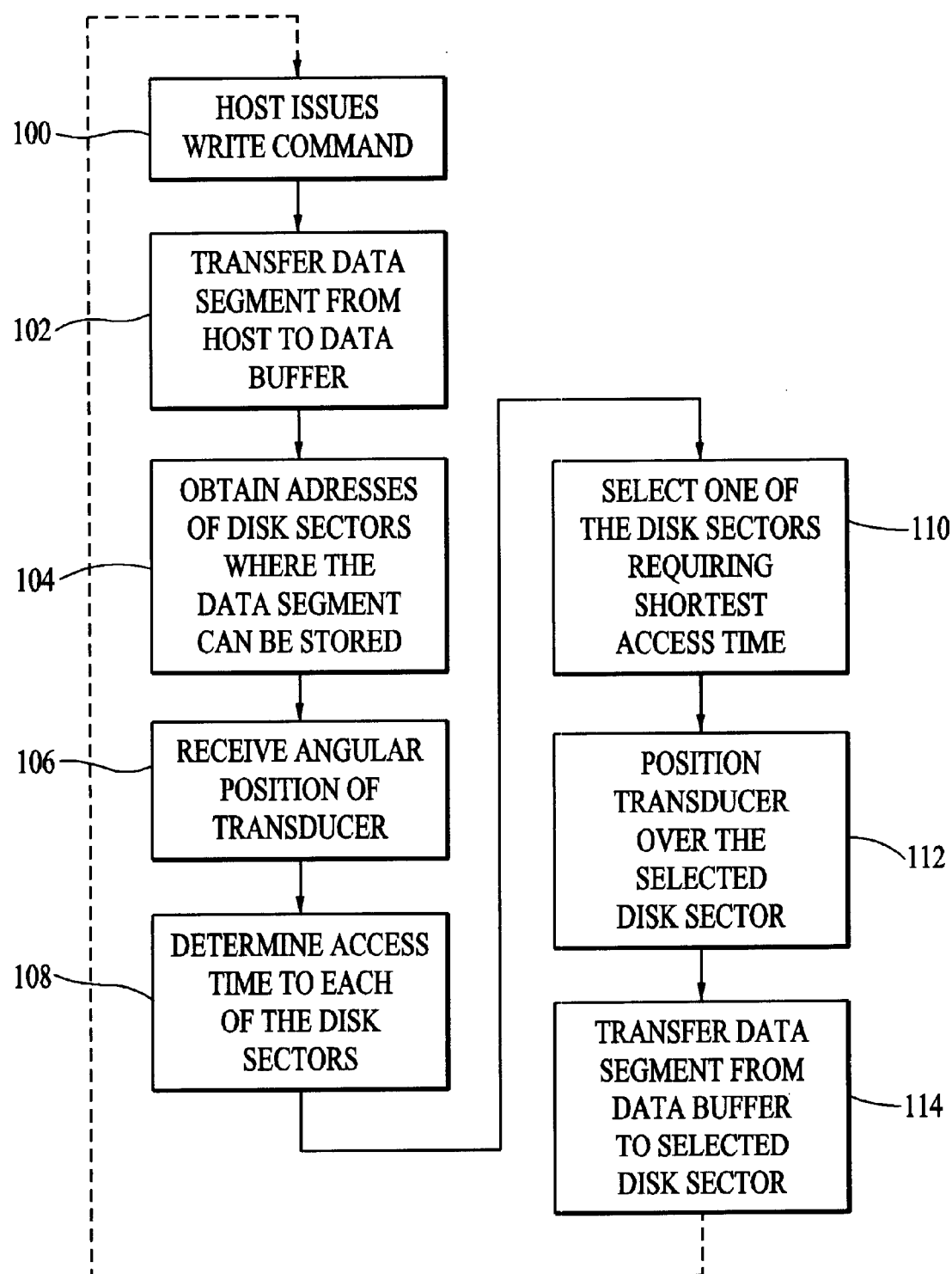
FIG. 9 shows an example logical flowchart of the steps of an embodiment of a process implementing the present invention for writing data segments to data disks.
Figures 10, 11:
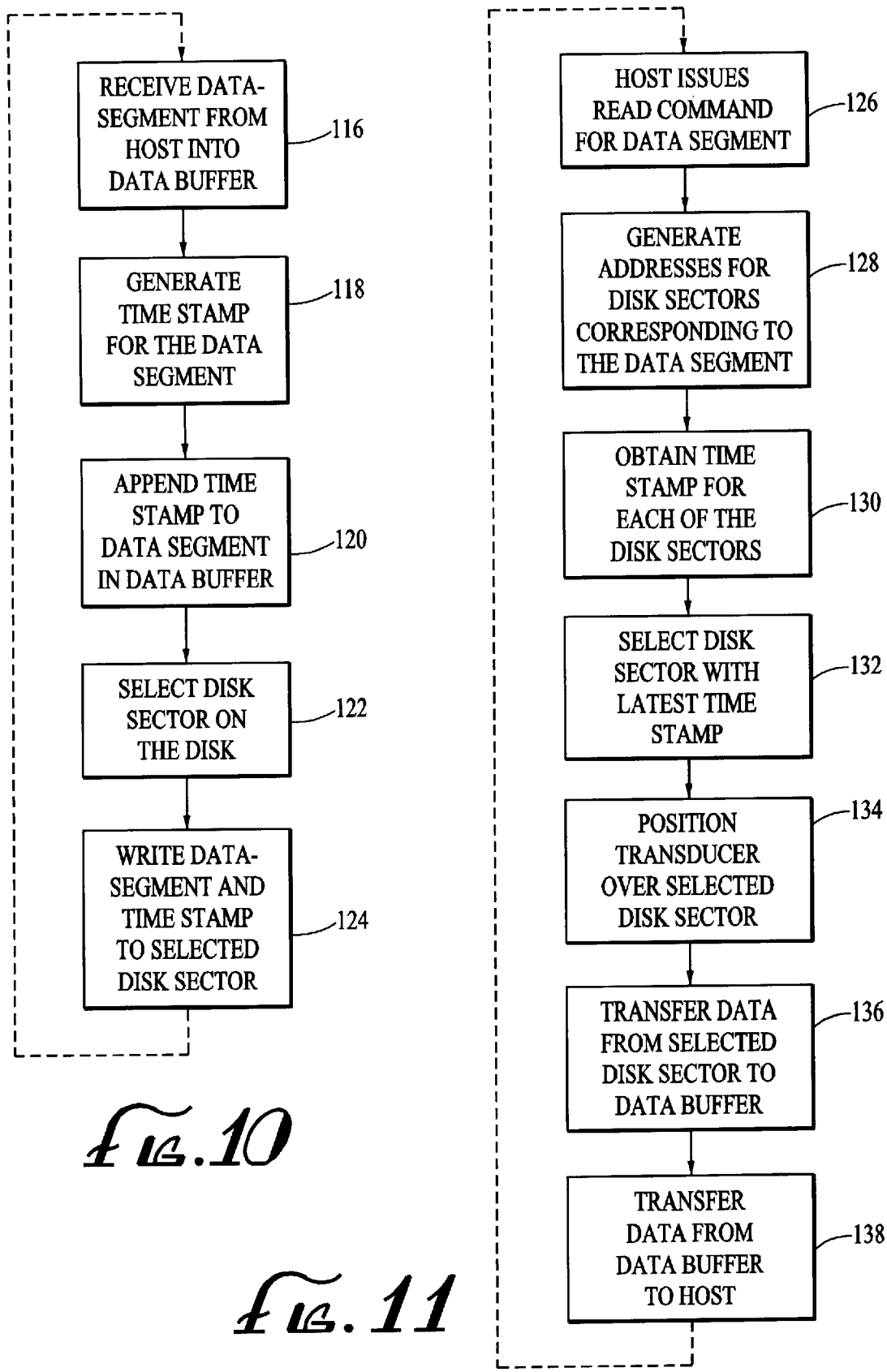
FIG. 10 shows an example logical flowchart of the steps of an embodiment of a process implementing the present invention for writing time stamped data segments to data disks.
FIG. 11 shows an example logical flowchart of the steps of an embodiment of a process implementing the present invention for reading time stamped data segments from data disks.

FIGS. 9, 10 and 11 show example flowcharts of a process for implementing an aspect of the present invention on the controller 56 for reducing the access time in writing data segments 72 to the disk 22. In this embodiment, in response to a command from the host 58 to write a data segment 72 to the disk 22, the controller 56 receives the data segment 72 in the data buffer 80 and records the data segment 72 in one of the two disk sectors 76 and 78 corresponding to the data segment 72.

Referring to the flowchart in FIG. 9, the write process is initiated by the host 58 issuing a write command for writing the data segment 72 on the disk 22 (step 100). The processor 82 transfers the data segment 72 from the host 58 to the data buffer 80 (step 102). The identifier 74 of the data segment 72 is utilized to obtain the addresses of the two disk sectors 76 and 78 where the data segment 72 can be stored as described above (step 104). The processor 82 then selects one of the two disk sectors 76, 78 corresponding to the data segment 72 to write the data segment 72 thereon.

As such, the processor 82 first receives the angular position of the transducer 28 over the disk 22 from the VCM driver 54 (step 106). The processor 82 then determines the access time for each of the two alternate disk sectors 76, 78 based on the angular position of the transducer 28 with respect to each of the disk sectors 76 and 78 (step 108). The access time for each disk sector includes the seek time and the rotational latency for positioning the transducer 28 over the disk sector. In one embodiment of the present invention, the processor 82 selects one of the two disk sectors 76, 78 which requires the shortest access time (step 110). Next the processor 82 directs the VCM driver 54 to position the transducer 28 over the selected disk sector (step 112). The processor 82 transfers data from the data buffer 80 to the selected disk sector via the transducer 28 (step 114).

In an example operation in FIG. 5, the host 58 generates a command for the processor 82 to write the data segment 72 on the disk 22. Using the data segment identifier 74, the addresses of the first disk sector 76 and the second disk sector 78 where the data segment 72 can be stored are then obtained. The disk sectors 76, 78 are on the same track T of the disk 22 and are positioned out phase in relation to one another. Preferably, the angular position of the disk sectors 76, 78 is about 180 degrees out of phase. However, other angular positions are also possible and contemplated by the present invention. In this example, the processor 82 determines that the first disk sector 76 requires a shorter access time than the second disk sector 78 based on the angular position of the transducer 28, and as such the processor 82 selects the first disk sector 76 for recording the data segment 72. The processor 82 then directs the VCM driver 54 to position the transducer 28 over the first disk sector 76 on track T for recording the data segment 72 thereon as shown. For replication purposes, the processor 82 can additionally record the data segment in the disk sector 78 in step 114, or thereafter during an idle period before another write operation for that data segment and before a read operation for that data segment which relies on replication.

In a subsequent command from the host 58 to write a later version of the data segment 72 with said identifier 74 to the disk 22, if the access time associated with the second disk sector 78 is less than that of the first disk sector 76 at the time of said subsequent write command, the processor 82 then selects the second disk sector 78 for recording the data segment 72 thereon.

Because the data segment 72 is stored in only one of two disk sectors 76, 78 corresponding to the data segment 72, preferably chronological information is maintained for identifying the relative order or time of recording data in each of the disk sectors 76, 78. When the host 58 later requests the data segment 72 previously recorded on the disk 22, the chronological information can be used by the processor 82 to retrieve data from one of the disk sectors 76, 78 recorded to last in order, where the data includes the latest version of the data segment 72. As such, for each data segment 72, chronological information is maintained to identify the relative order of recording data in each of the two disk sectors corresponding to that data segment 72. The chronological information can be maintained by the processor 82 in memory or on the disk 22.

Referring to the flow chart in FIG. 10, in one example implementation of maintaining said chronological information, upon receiving a data segment 72 in the data buffer 80 from the host 58 for writing to the disk 22 (step 116), the processor 82 generates said chronological information for the data segment 72 (step 118). The chronological information can include a time stamp which the processor 82 can obtain from an external time source such as a monotonic counter driven by an event source. The processor 82 appends the time stamp as a few additional bytes to the data segment 72 in the data buffer 80 (step 120). Next, the processor 82 selects a target disk sector among two disk sectors corresponding to the data segment 72 (step 122). The step 122 of selecting the target disk sector can include the steps 104 through 110 described above in relation to FIG. 9. The time stamp and data segment bytes are then written to a target disk sector (step 124). For replication purposes, the processor 82 can additionally record the data segment with said time stamp in the other of the two disk sectors (such that both data sectors have the same time stamp) in step 124, or thereafter during an idle period before another write operation for that data segment and before a read operation for that data segment which relies on replication.

Alternatively, the chronological information can include a monotonic count that the processor 82 can obtain from a monotonic counter, thereby eliminating the need for said external time source. For example, a 64-bit monotonic count of the number of disk sectors written to is maintained in memory over the entire lifetime of the disk drive 10. Every time a disk sector is written to, the current monotonic count is stored in that disk sector and the monotonic count is then incremented. In one implementation, to maintain the monotonicity of said count across power failures, a disk sector is reserved to store the high 32 bits of the count. On power up, the count in the reserved disk sector is incremented by one and written back to the reserved disk sector. The count in memory is then initialized to the value stored in the reserved disk sector and multiplied by $2^{32}$. Consequently, if less than $2^{32}$ writes occur between power failures, the monotonicity of the count is maintained. To guarantee monotonicity, the value in said reserved disk sector is updated on every $2^{32}$nd write operation within a single power-up occurrence.

The host 58 can request data segments 72 previously recorded on the disk 22. In response to a command from the host 58 to read a data segment 72 from the disk 22, the processor 82 examines the chronological information for the disk sectors corresponding to the data segment 72. Based on said chronological information the processor 82 then accesses one of said disk sectors which stores the last recording of the data segment 72. Next, the processor 82 reads the data in the accessed disk sector and provides it to the host 58.

Referring to the flowchart in FIG. 11, the read process is initiated by the host 58 issuing a command for reading a data segment 72 from the disk 22 (step 126). The processor 82 utilizes the identifier 74 of the data segment 72 to generate the addresses of the two disk sectors 76, 78 corresponding to the data segment 72 where the data segment 72 can be stored (step 128). The processor then obtains the chronological information, such as a time stamp, for each of the disk sectors 76, 78 (step 130). Where the chronological information for each of the disk sectors 76, 78 is stored in the disk sectors themselves, the processor 82 utilizes the addresses of the disk sectors 76, 78 to direct the VCM driver 54 to position the transducer 28 over each of the disk sectors 76, 78 to retrieve the chronological information from each of the disk sectors 76, 78.

Based on the chronological information retrieved from the disk sectors 76, 78, the processor 82 selects a disk sector among the two disk sector 67, 78 that stores a most recently recorded copy of the requested data segment 72 therein (step 132). In embodiments where a monotonic count is used, the processor 82 examines the monotonic count in each of the disk sectors 76, 78 to determine which is larger. The processor 82 selects a disk sector with the larger count to retrieve the last recording of the data segment 72.

The processor 82 then directs the VCM driver 54 to position the transducer 28 over the selected disk sector (step 134), and transfers data from the selected disk sector into the data buffer 80 (step 136). Alternatively, the processor 82 can read the entire contents of each of said disk sectors 76, 78 into the data buffer 80 and then examine the chronological information for each disk sector read into the data buffer 80. In either case, the processor 82 then transfers the latest recording of the data segment from the data buffer 80 to the host 58 (step 138).

In an example operation in FIG. 5, the host 58 generates a command for the processor 82 to read a data segment 72 from the disk 22. Using the data segment identifier 74 of the data segment 72, the addresses of the first disk sector 76 and the second disk sector 78 where the data segment 72 can be stored are then obtained. In the example shown in FIG. 5, the disk sectors 76 and 78 are on the same track T of the disk 22 and are positioned out phase in relation to one another. The processor 82 directs the VCM driver 54 to position the transducer 28 over the track T by a seek operation, and as the first and second disk sectors 76, 78 pass under the transducer 28, the data in each of the disk sectors 76, 78 is transferred into the data buffer 80. Where the disk sectors 76, 78 are on different tracks or on different disk surfaces then accessing each disk sector may require a seek operation. The processor 82 then examines the chronological information, such as a time stamp, of each of the disk sectors 76, 78 read into the data buffer 80 and determines that the time stamp for the second disk sector 78 is later than that of disk sector 76. As such, the processor 82 transfers data read from the disk sector 78 from the data buffer 80 to the host 58.

The requirement to read data from both of the disk sectors 76, 78 can be eliminated by maintaining in memory a map of disk sectors with most recent copies of corresponding data segments therein. The map can comprise a bit-map including a bit indicator for each disk sector. As such, the processor 82 can examine the indicator bits for each of the two disk sectors corresponding to a data segment identifier 74, and only read data from one of the disk sectors whose indicator bit identifies it to store the most recent copy of the data segment 72 therein. For example, only one mega-byte of random access memory is required to maintain a complete bit-map of disk sector indicators per four giga-bytes of data disk space. The bitmap is incrementally initialized by performing a complete read of each track 62 when that track 62 is first accessed within a power-up session. Alternatively, a memory cache can be used to monitor the disk sectors 64 most recently written to on a track 62. The cache memory can include either a bitmap with as many bits as disk sectors 64 on all or part of a track 62, or a granular map of individual disk sectors 64 on each track 62.

To improve the read access time of the disk drive 10, in addition to writing the data segment 72 to one of the two disk sectors 76, 78 corresponding to that data segment 72 as described above, the processor 82 can replicate the data segment 72 and generate a duplicate copy of the data segment 72 in the data buffer 80. The processor 82 then writes said duplicate copy to another of the two disk sectors 76, 78 at a later time, such as when the disk drive 10 is idling. As such, the processor 82 can provide consistent replicas of each data segment 72 in disk sectors corresponding to that data segment 72, and upon a command from the host 58 to read the data segment 72, either of the disk sectors corresponding to the data segment 72 can be accessed for retrieving the latest version of the data segment 72. In one embodiment, the processor 82 accesses one of said corresponding disk sectors with shortest access time to retrieve data therefrom.

FIGS. 12, 13, 14 and 15 show example flowcharts of a process for implementing another aspect of the present invention on the controller 56 for reducing the access time in reading data segments 72 from the disk 22. In this embodiment, in response to a command from the host 58 to write a data segment 72 to the disk 22, the controller 56 receives the data segment 72 in the data buffer 80 and writes the data segment 72 in the two disk sectors corresponding to the data segment 72.

Figure 12:
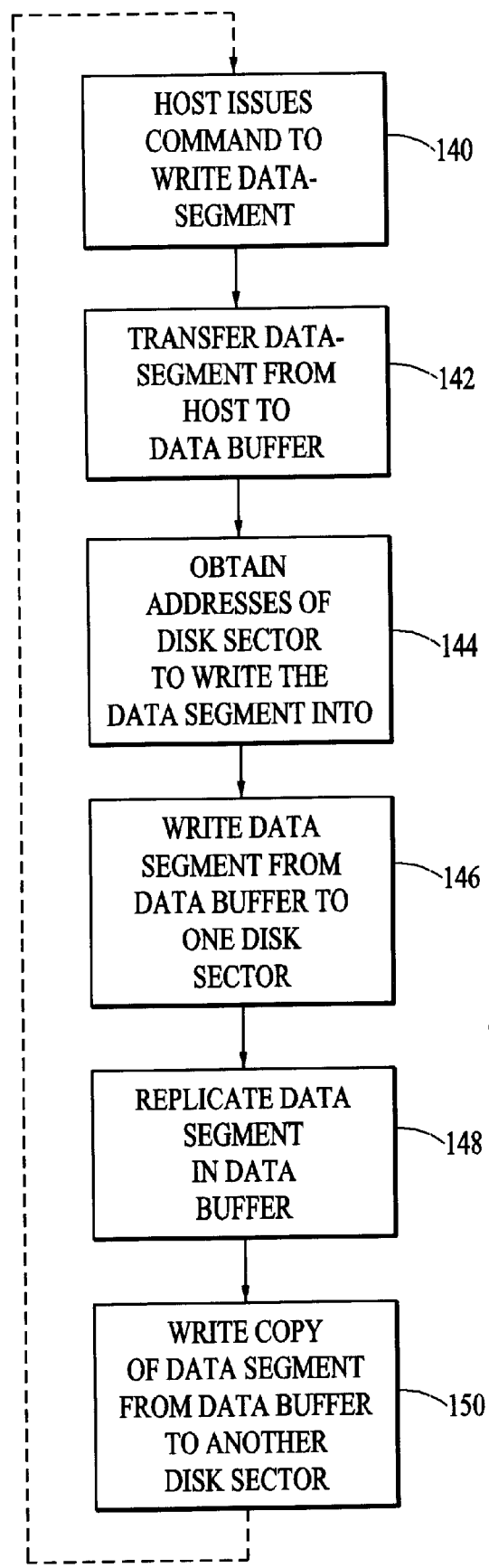
FIG. 12 shows an example logical flowchart of the steps of an embodiment of a process implementing the present invention for writing each data segment to data disks a multiplicity of times in a designated order.
Figure 13:
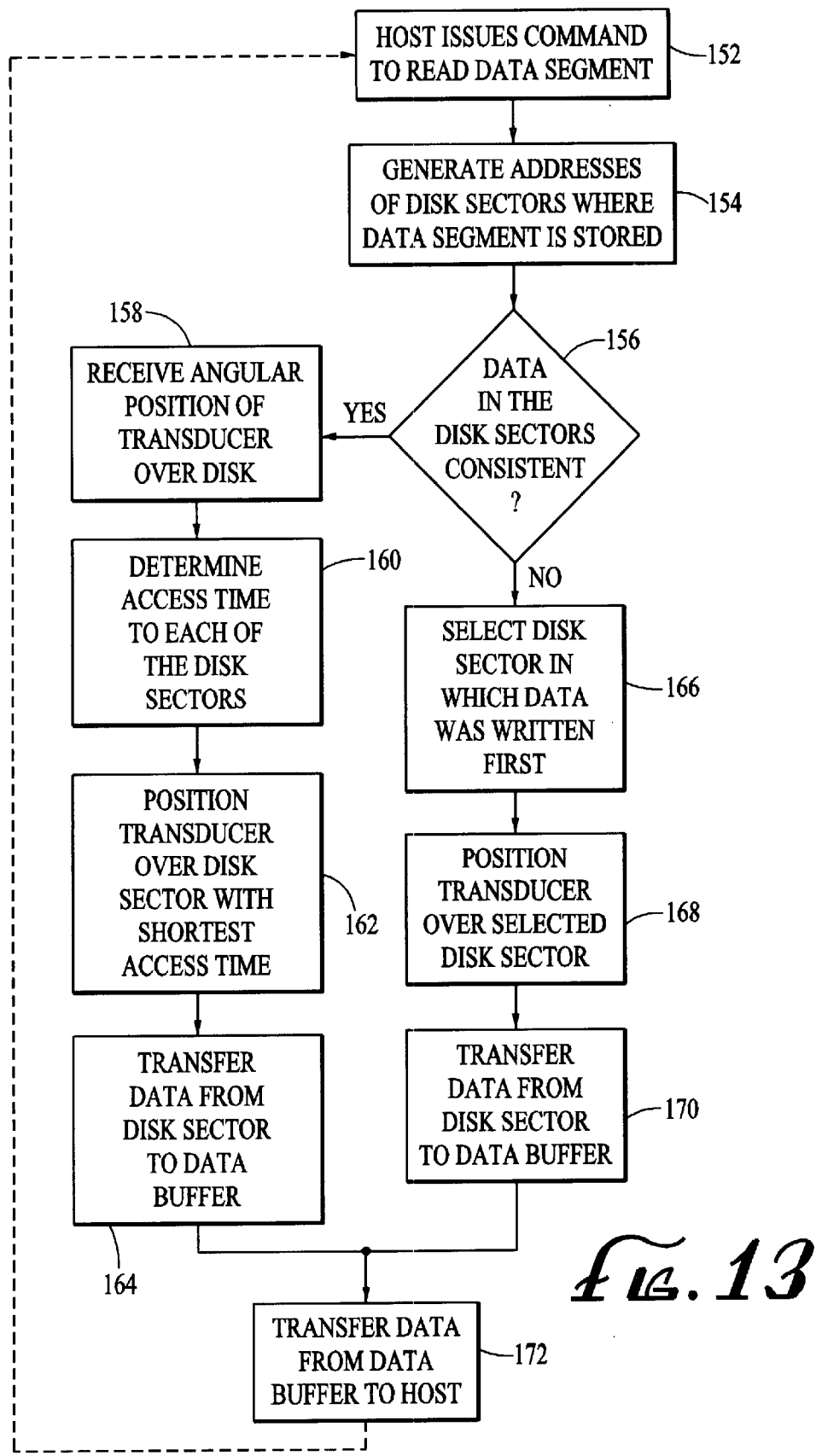
FIG. 13 shows an example logical flowchart of the steps of an embodiment of a process implementing the present invention for reading ordered copies of a data segment from data disks.

Referring to the flowchart in FIG. 12, the write process is initiated by the host 58 issuing a write command for writing the data segment 72 on the disk 22 (step 140). The processor 82 transfers the data segment 72 from the host 58 to the data buffer 80 (step 142). The processor 82 then proceeds to write data from the data buffer 80 to the disk 22 as follows. The identifier 74 of the data segment 72 in the data buffer 80 is utilized to obtain the addresses of two disk sectors corresponding to the data segment 72 where the data segment 72 can be stored (step 144). The disk sector addresses can be obtained as described above. The processor 82 then directs the VCM driver 54 to position the transducer 28 to transfer the data segment 72 from the data buffer 80 to one of said two disk sectors (step 146). The processor 82 also replicates the data segment 72 and generates a duplicate copy of the data segment 72 in the data buffer 80 (step 148). The processor 82 directs the VCM driver 54 to position the transducer 28 to write the duplicate copy of the data segment 72 from the data buffer 80 to the other of said two disk sectors (step 150). Alternatively, the processor 82 can skip step 148, and instead of creating a duplicate copy of the data segment 72 within the data buffer 80, the processor 82 can write the same copy of the data segment 72 from the data buffer 80 to one of the two disk sectors first in step 146, and then to another of the two disk sectors next in step 150.

In an example operation in FIG. 5, the host 58 generates a command for the processor 82 to write a data segment 72 on the disk 22. Using the data segment identifier 74, the processor 82 determines the addresses of a first disk sector 76 and a second disk sector 78 where the data segment 72 can be stored. The disk sectors 76, 78 are on the same track T of the disk 22 and are positioned out phase in relation to one another. Preferably, the angular position of the disk sectors 76, 78 is about 180 degrees out of phase. However, other angular positions are also possible and contemplated by the present invention. The processor 82 then proceeds to write the data segment 72 from the data buffer 80 to both the disk sectors 76 and 78.

Preferably, in steps 146 and 150 above, the processor 82 writes the data segment 72 to the disk sectors 76 and 78 in a predesignated order. In one example, the processor 82 selects the first disk sector 76 for recording the data segment 72, and directs the VCM driver 54 to position the transducer 28 over the first disk sector 76 on track T for recording the data segment 72 thereon. The processor 82 then directs the VCM driver 54 to position the transducer 28 over the second disk sector 78 on track T for recording the data segment 72 thereon. In subsequent write operations for a data segment 72 with the identifier 74 from which the addresses of the disk sectors 76, 78 were generated, the processor 82 always writes the data segment 72 to the first disk sector 76 first, and then to the second disk sector 78.

This is advantageous in cases where, for example, after writing the data segment 72 to the first disk sector 76 the power to the disk drive 10 fails before the processor 82 has written the data segment 72 to the second disk sector 78 as well. When the power is restored and the host 58 requests the data segment 72 from the disk drive 10, the first disk sector 76 contains the most recent, and therefore correct, version of the data segment 72 to be retrieved and returned to the host 58. As such, the first disk sector 76 always contains the correct copy of the data segment 72 to be retrieved for the host 58 across power failures. Alternatively, the processor 82 can always write to the second disk sector 78 first, and then to the first disk sector 76, whereupon the second disk sector 78 always contains the correct copy of the data segment 72 to be retrieved for the host 58 across power failures.

In either case, the disk sector written to first will always contain the most recent and correct copy of a corresponding data segment 72 to provide to the host 58 in response to a read command. Referring to the flowchart of FIG. 13, in an example read operation, the read process is initiated by the host 58 issuing a command for reading the data segment 72 from the disk 22 (step 152). The processor 82 utilizes the data segment identifier 74 to generate the addresses of the two disk sectors 76, 78 corresponding to the data segment 72 where the data segment is stored (step 154). The processor 82 then determines if data in both disk sectors 76, 78 are identical or consistent (step 156). If so, then in a first mode of operation the processor 82 first receives the angular position of the transducer 28 over the disk 22 from the VCM driver 54 (step 158). The processor 82 then determines the access time for each of the two disk sectors 76, 78 based on said angular position of the transducer 28 (step 160). The access time for each disk sector can include a seek time and rotational latency for the disk sector. The processor 82 then directs the VCM driver 54 to position the transducer 28 over one of the two disk sectors 76, 78 which requires the shortest access time (step 162). Next, the processor 82 transfers data from the selected disk sector to the data buffer 80 (step 164).

However, if in step 156 above, data in both disk sectors corresponding to the data segment are not consistent, then in a second, alternative mode of operation, the processor 82 selects one of the two disk sectors 76, 78 in which data was written to first as described above (step 166). For example, if in response to write commands the processor 82 in a designated order always writes to the first disk sector 76 first, and then to the second disk sector 78, then in response to read commands in this second mode of operation the processor 82 always selects the first disk sector 76 to read from. The processor 82 then directs the VCM driver 54 to position the transducer 28 over the selected disk sector (step 168) and transfers data from the selected disk sector to the data buffer 80 (step 170). In either mode of operation, the processor 82 then transfers the data read into the data buffer 80 to the host 58 (step 172).

In step 156 above, for each data segment 72 the processor 82 selects between the first and second modes of operation based on information indicating consistency, or otherwise, between data in two disk sectors corresponding to that data segment 72. In one example process, after powerup the processor 82 in a background process verifies that for each data segment 72 the data in disk sectors corresponding to that data segment 72 are identical and consistent, and stores consistency information indicating so. Referring to the flowchart in FIG. 14, in an example operation scenario, for each data segment 72 the processor 82 reads all of the copies of that data segment 72 from corresponding disk sectors 76, 78 (step 174) and determines if they are the same (step 176). Because data was written to the disk sectors 76, 78 in a designated order as described above, if data in the disk sectors 76 and 78 are not the same, the processor 82 retrieves the data from one of the disk sectors 76, 78 that was written to first (e.g., disk sector 76) (step 178) and updates data in the other of the disk sectors 76, 78 (e.g., disk sector 78) with data in one of the two disk sectors written to first (step 180).

In the meantime, in a foreground process, in response to read commands from the host 58, the processor 82 operates in said second mode. After the processor 82 has verified consistency for all of the data segments on the disk 22 in said background process (step 182), the processor 82 can store indicator information on the disk 22, or other storage area, to indicate said consistency of data on the disk 22 (step 184). Thereafter, utilizing the indicator information, the foreground process of the processor 82 in step 156 above can resume operating in the first mode in response to read commands from the host 52 and read the closest copy (i.e. copy with shortest access time) of each data segment 72 on the data disk, and not just the first copy.

Further, as the processor 82 verifies data segments on the disk 22 for consistency in said background process, the processor 82 operates in the first mode in said foreground process for servicing read commands from the host 58 for data segments 72 previously verified for consistency. This is the case although other data segments 72 on the data disk 22 may still be unverified and inconsistent. The processor 82 operates in the second mode in said foreground process for servicing read commands for unverified or inconsistent data segments.

For example, the processor 82 can verify consistency for data in disk sectors corresponding to data segments 72 stored near data segments requested by one or more preceding read commands from the host 58. As such, said background verification process does not cause long transducer seeks away from disk sectors being accessed for a requested data segment 72. Further, if the workload for the disk drive 10 has spatial locality, then disk sectors accessed most often are verified rapidly. As such, in said foreground process the processor 82 can operate in the first mode in response to read commands from the host 58 in order to take advantage of reductions in read access time for most disk sectors even if only a fraction of the data segments on the data disk have been verified for consistency in said background process.

Further, as the processor 82 in said background process verifies data consistency between individual disk sectors corresponding to a data segment, if the host 58 issues a read command for that data segment, the processor 82 in the foreground process operates in the first mode with respect to the verified and consistent disk sectors of that data segment to take advantage of reduced access time among the verified disk sectors of that data segment to service the read command. As such, the processor 82 can select a disk sector among the verified disk sectors of the data segment which requires the shortest access time to read therefrom.

Referring to the flowchart in FIG. 15, to reduce the duration of the verification process, the processor 82 can detect when the disk drive 10, or a file system stored on the data disk 10, is being shut down (step 186) and if the processor 82 has completed servicing all write commands from the host 58 (step 188), the processor 82 can record an 'all consistent' notation in a reserved area on the disk 22, or other storage area (step 190). Thereafter, on power-up the processor 82 can access the reserved area for the 'all consistent' notation, and if there, skip the verification steps described above in relation to FIG. 14 as indicated by the additional step 192 in FIG. 14. Further, before performing any writes to the disk 22, the processor 82 overwrites the 'all consistent' notation with a 'not consistent' notation in the reserved area. Alternatively, instead of waiting for said file system or the disk drive 10 to be shut down in step 186 of FIG. 15, after the processor 82 has completed servicing all write commands from the host 58 in step 189, the processor 82 can record the 'all consistent' notation during periods of idleness in step 190. As such if power is shut off during one of the idling periods, data consistency among disk sectors corresponding to each data segment is assured.

The disk 22 can be partitioned such that the processor 82 only verifies consistency of data in disk sectors corresponding to data segments stored in one or more partitions of the disk 22, rather than all data segments stored on the entire disk 22. In that case, recording the 'all consistent' information can be applied to different partitions of the disk 22 independently. For example, the disk 22 can be divided into four partitions. If the data segments in one of the four partitions have not been verified and updated to be consistent as described above, then that partition is marked inconsistent. Further, if data segments in other partitions have been verified and updated to be consistent, then said partitions are marked as being consistent. Then, in case of a power failure, the processor 82 only verifies the consistency of data segments 72 in disk partitions marked as inconsistent. Partitions marked as consistent need not be verified by the processor 82, thereby shortening the time from powerup after which the processor 82 can utilize the consistency among disk sectors corresponding to each data segment on the data disk to operate in said first mode of operation in responding to read commands from the host 58 for data segments on the disk 22.

As such, copies of a data segment on the disk 22 may remain in an inconsistent mode for a period of time until the processor 82 assures consistency among the copies as described above. In one example, copies of a data segment on the disk 22 can become inconsistent because the data segment is replicated on the disk 22 multiple regions, and if there is a power down before processor 82 stores the data segment in all said multiple regions, some of the multiple regions will contain old data and are therefore inconsistent with the updated ones of the multiple regions. When power is restored, the processor 82 updates said regions including old data, with data consistent with the updated regions to store consistency among all copies of the data segment on the disk 22. Thereafter, after a write operation the copies of the data segment may become inconsistent again and remain so until the processor 82 makes them consistent again.

An alternative to writing data to disk sectors for each data segment in a designated order as discussed above, is to maintain chronological information for each of the disk sectors corresponding to a data segment 72 when said disk sectors are written to the disk 22. Then, upon a command from the host 58 to read a data segment 72 from the disk 22, the processor 82 can examine the chronological information for all disk sectors corresponding to that data segment 72 to determine either: (1) that data in all of said disk sectors are the same, or (2) if not, which of said disk sectors contains the most recent recording of that data segment 72 for transfer to the host 58.

Figure 16:
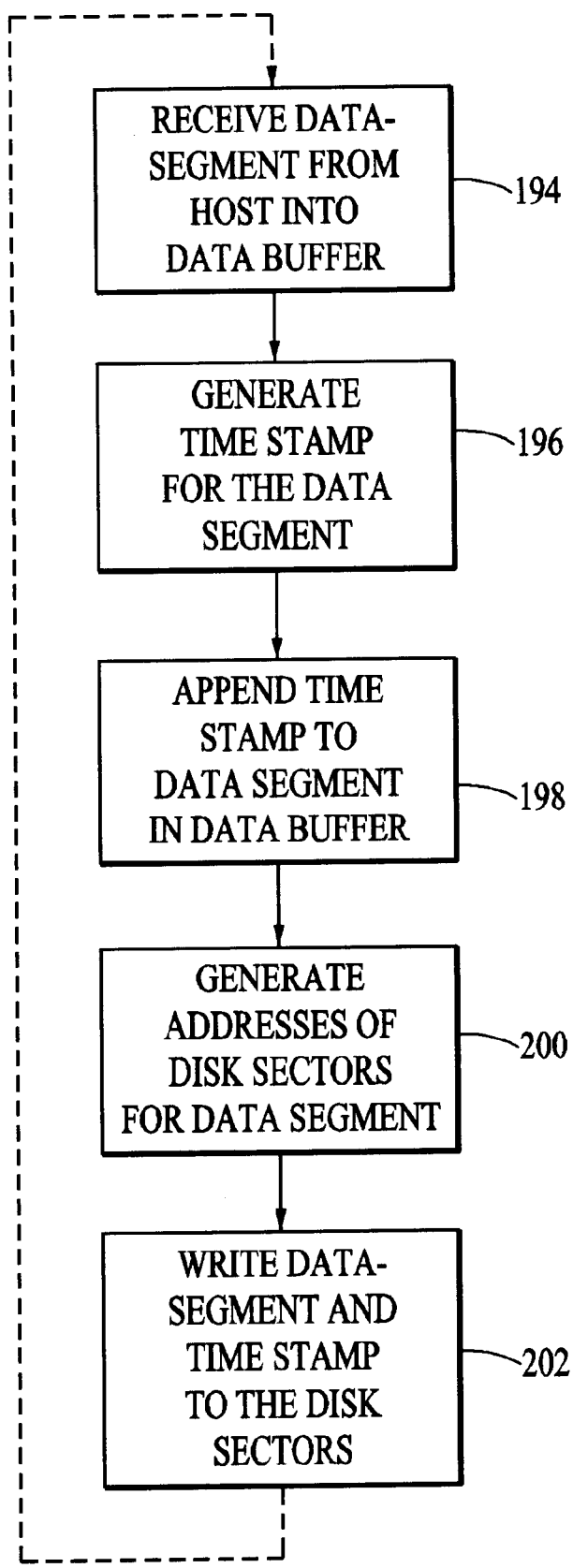
FIG. 16 shows an example logical flowchart of the steps of an embodiment of a process implementing the present invention for writing time stamped data segments to data disks.

Referring to the flow chart in FIG. 16 in conjunction with FIG. 5, in one example implementation, the processor 82 receives a data segment 72 in the data buffer 80 from the host 58 for writing to the disk 22 (step 194). The processor 82 then generates said chronological information for the data segment 72 in the data buffer 80 (step 196). The chronological information can include a time stamp or monotonic count as described above. The processor 82 appends the same time stamp as a few additional bytes to the data segment 72 in the data buffer 80 (step 198).

The processor 82 utilizes the identifier 74 of the data segment 72 to generate addresses of the disk sectors 76 and 78 corresponding to the data segment 72 (step 200). Next, the processor 82 directs the VCM driver 54 to position the transducer 28 over each of the disk sectors 76 and 78 and write the data segment 72 including the time stamp, from the data buffer 80 to each of the disk sectors 76, 78 (step 202). Alternatively, in step 194 the processor 82 can replicate the data segment 72 in the data buffer 80 and append the same time stamp as a few additional bytes to each copy of the data segment 72 in the data buffer 80 in step 198. The processor 82 then writes each time stamped copy of the data segment 72 to the disk sectors 76 and 78 in step 202. Thereafter, the host 58 can retrieve a data segment 72 from the disk 22 according to the steps described in relation to FIG. 11.

Figure 17:
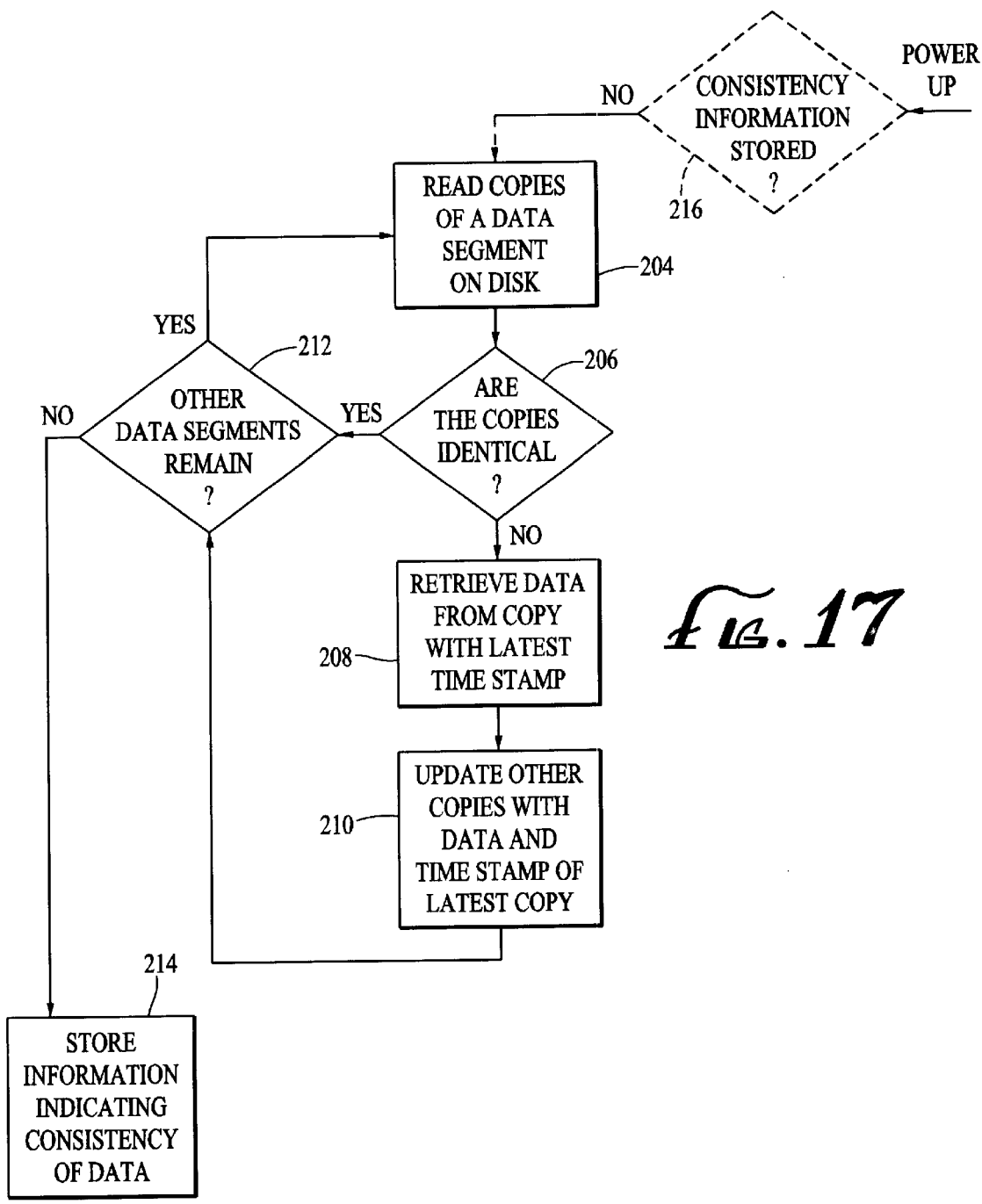
FIG. 17 shows an example logical flowchart of the steps of an embodiment of a process implementing the present invention for verifying consistency between time stamped copies of each data segment on data disks.

Further, in a background process the processor 82 can verify that for each data segment 72 all copies of that data segment 72 on the disk 22 are consistent. The processor 82 reads all of the copies of that data segment 72 from corresponding disk sectors to check that they are the same. Where they are not, the processor 82 obtains data from a disk sector among said corresponding disk sectors with the latest time stamp. The processor 82 then updates data and time stamp in the remaining data sectors of said corresponding data sectors for that data segment 72. Referring to the flowchart in FIG. 17 in conjunction with FIG. 5, in one operation sequence, for each data segment 72 the processor 82 reads all of the copies of that data segment 72 from corresponding disk sectors (step 204) and determines if they are the same (step 206). For example, for a data segment 72 with corresponding disk sectors 76, 78, if data in the disk sectors 76 and 78 are not the same, the processor 82 retrieves the data from one of the disk sectors 76, 78 that has the latest time stamp (e.g., disk sector 78) (step 208) and updates data and time stamp in the other of the disk sectors 76, 78 (e.g., disk sector 76) with said retrieved data (step 210).

In the meantime, in a foreground process, in response to read commands from the host 58, the processor 82 operates in said second mode. After the processor 82 has verified consistency for all of the data segments on the disk 22 in that background process (step 212), the processor 82 can store indicator information on the disk 22, or other storage area, to indicate said consistency of data on the disk 22 (step 214). Thereafter, utilizing the indicator information, the foreground process of the processor 82 in step 156 of FIG. 13 above can resume operating in the first mode in response to read commands from the host 52 and read the copy of each data segment 72 on the disk 22 from a disk sector with the shortest access time.

Referring back to FIG. 17, on power up of the disk drive 10, if the 'all consistent' notation described above is not stored, in response to a read command from the host 58 for each data segment 72, the processor 82 examines the time stamps for disk sectors corresponding to that data. After verifying that data in said disk sectors are consistent, the processor 82 can then retrieve data from one of said disk sectors with the shortest access time. However, if the 'all consistent' notation is stored, the processor 82 can skip the verification steps above (step 216). Other implementation of the verification process, can be as specified in steps 186 through 190 in FIG. 15 and corresponding description above.

On power up, the processor 82 utilizes the latest chronological information utilized before power up as a base for writing data to the disk 22 after power up. In one implementation, where the chronological information is stored in each disk sector 64, the processor 82 scans the disk 22 to determine the latest time stamp stored, and thereafter the processor 82 utilizes said latest time stamp as a base value for later recording of data to the disk 22. In another implementation, the processor 82 records the current time stamp, S, in a reserved storage location after servicing every N write commands, wherein N can range from 100 or 1000, for example. On powerup, the processor reads the saved time stamp S, wherein a time stamp utilized for a first write command after power up is (S+N). The time stamps utilized by the processor 82 increases monotonically.

In another embodiment of the invention, to ensure consistency of data stored in disk sectors corresponding to each data segment, a non-volatile memory is employed, whereby using an indicator process the processor 82 maintains inconsistency information for each data segment 72 recorded on the disk 22. The inconsistency information for a data segment identifies one or more of the disk sectors 64 corresponding to that data segment 72 which do not include identical copies of that data segment 72 most recently recorded therein.

For example, the inconsistency information can be maintained as a table in memory, where the table includes entries corresponding to inconsistent disk sectors for each data segment 72. The table is initially maintained by the processor 82 while the processor 82 writes data onto data sectors corresponding to each data segment. Therefore, the processor 82 can maintain all copies of data segments on the disk 22 consistent. If however, for a data segment 72 the processor 82 cannot write the data segment 72 to all the disk sectors corresponding to that data segment 72, then the inconsistent data sectors for that data segment 72 are marked in the table. In case of main power failure, the table can be stored from memory to the disk 22, for example, with a small amount of power such as a battery.

Referring to the flowchart in FIG. 18, in one example implementation of maintaining said consistency information, upon receiving a data segment 72 in the data buffer 80 from the host 58 for writing to the disk 22 (step 218), the processor 82 generates chronological information such as a time stamp for the data segment 72 (step 220). The processor 82 appends the time stamp as a few additional bytes to the data segment 72 in the data buffer 80 (step 222). Next, the processor 82 attempts to write the data segment with the time stamp to disk sectors corresponding to the data segment 72 (step 224). The processor 82 then determines if all the writes of the data segment to said corresponding disk sectors were successful (step 226). If the processor 82 was unable to write the data segments 72 to all the disk sectors corresponding to the data segment 72, then the processor 82 marks the inconsistent disk sectors for that data segment in said table of inconsistency information (step 228).

At powerup, the table can be reloaded into memory for use by the processor 82. The table can also be stored in non-volatile memory which can include non-volatile RAM with battery backup or a self-contained module which transfer data from RAM into a Flash ROM on power fail. Alternatively, an area on the disk 22 can be used as the non-volatile memory, whereby power source means such as a battery or a large capacitor is utilized to provide power to the disk drive 10 after loss of main power, to record the consistency information on said area of the disk 22.

As such, the inconsistency information for each data segment 72 identifies one or more of the disk sectors 64 corresponding to that data segment 72 which contain inconsistent data, and also identifies a disk sector 64 containing the most recent recording of that data segment 72. Referring to the flowchart in FIG. 19, on power up, before responding to any read or write commands from the host 58, the processor 82 examines the inconsistency table in memory (step 230) and retrieves data and time stamp from said disk sector containing the most recent recording of that data segment 72 (step 232) and updates any inconsistent disk sectors 64 corresponding to the data segments 72 with said data and time stamp (234). The processor 82 can also perform the updating steps in a background process, and respond to read and write commands from the host 58 in a foreground process as detailed above.

Further, as described earlier, in response to a command from the host 58 to read a data segment 72, if data in the data sectors corresponding to that segment 72 are consistent, the processor 82 can retrieve data from one of disk sectors corresponding to the data segment 72, wherein that one disk sector requires the shortest access time among said disk sectors. Alternatively, if data in said disk sectors are not consistent, the processor 82 can retrieve data from one of said disk sectors corresponding to the data segment 72, wherein that one disk sector includes the latest version of the data segment 72 based on a time stamp.

For improved reliability, in another embodiment of the invention, if the processor 82 encounters a read error in retrieving data from a first disk sector of the disk sectors corresponding to a data segment 72, the processor 82 proceeds to read data from a second disk sector of said disk sectors corresponding to that data segment 72. If an error is encountered reading from the second disk sector, the processor 82 engages in electronic and non-heroic recovery of data from the second disk sector. If that fails, the processor 82 engages in electronic and non-heroic recovery of data from the first disk sector again. If that fails as well, the processor 82 engages in heroic recovery of data from the first disk sector and if unsuccessful, then from the second disk sector. This scheme reduces the variance in successful reads because reading data from the second disk sector can be faster than recovery of data from the first disk sector by heroic-recovery, for example. This also reduces the frequency with which the processor 82 engages in heroic recovery.

Referring to the flowchart in FIG. 20 in conjunction with FIG. 5, an example read process is initiated by the host 58 issuing a command for reading a data segment 72 from the disk 22 (step 236). The processor 82 utilizes the identifier 74 of the data segment 72 to generate the addresses of the two disk sectors 76, 78 corresponding to the data segment 72 where the data segment 72 is stored (step 238). The processor 82 selects one of the disk sectors 76, 78 for retrieving data from (240). Selecting a disk sector can be based on the shortest access time to the disk sector (e.g. disk sector 76) as described above. The processor 82 then utilizes the address of the selected disk sector to direct the VCM driver 54 to position the transducer 28 over the selected disk sector to read data therefrom to the data buffer 80 (step 242).

The processor 82 then determines if a read error occurred (step 244). If a read error occurred, the processor 82 then directs the VCM driver 54 to position the transducer 28 over a second disk sector of the disk sectors 76, 78 (e.g., disk sector 78) to read data therefrom to the data buffer 80 (step 246). The processor 82 then determines if a read error occurred (step 247). If so, the processor 82 engages in a first recovery mode and performs electronic and non-heroic recovery of data from said second disk sector 78 (step 249). The processor 82 determines if there is a error again (step 250), and if so the processor 82 engages in electronic and non-heroic recovery of data from the first disk sector again (step 252). The processor 82 determines if there is an error again (step 254), and if so the processor 82 engages in heroic recovery of data from the first disk sector (step 256) and checks for errors (step 258). If there is an error again, the processor 82 attempts heroic recovery from the second disk sector (step 260) and if unsuccessful, reports the error. If in the steps 244, 247, 250, 254, 258 or 262 the processor 82 does not encounter an error, it proceeds to transfer data read into the data buffer 80 to the host 58 (step 248). If the processor 82 cannot recover data from any of the disk sectors 76, 78 by heroic recovery, it reports a error to the host 58.

Where the disk sectors 76, 78 reside on different disks 22, the processor 82 can continue to provide data from one of the disk sectors 76, 78 (e.g., disk sector 76) even in the case of a transducer failure and loss of the ability to read an entire surface of one disk 22 affecting another of the disk sectors 76, 78 (e.g., disk sector 78). The processor 82 can further continue to provide data in case of a contiguous disk sector or complete track loss on one disk 22. Where the disk sectors 76, 78 reside on adjacent tracks, the processor 82 can recover data from one of the disk sectors 76, 78 in case of a contiguous sector loss or complete track loss affecting another of said disk sectors 76, 78. And, where said disk sectors 76, 78 reside on the same track 64, the processor 82 can recover data from one of the disk sectors 76, 78 in case of contiguous sector loss affecting another of said disk sectors 76, 78.

In another embodiment, the present invention improves the performance of the disk drive 10 in servicing write commands from the host 58 where the processor 82 performs a first and a second write of the data segment 72 to the disk 22 by positioning the transducer 28 over two different disk sectors for recording the data segment thereon, thereby replicating the data segment on the disk 22. Accessing each disk sector 64 can include a seek operation requiring a settling time window for the transducer 28 to settle over a target track 62 where that disk sector 64 resides. Therefore, the processor 82 must wait for at least the settling window period before writing data to the target track 62 in order to avoid overwriting data in tracks adjacent to the target track 62 (i.e., adjacent-track overwrite). In order to increase the performance of the disk drive 10 in response to write commands, the processor 82 can begin writing data to the target track 62 after a shortened settle window period. The settle window is shortened or reduced to levels at which data cannot be written at an acceptable adjacent-track overwrite rate in disk drives that do not implement replication.

Although the length of the settle window is reduced, because the second write occurs when the transducer 20 is completely settled, the reliability of the second write is high, thereby allowing later recovery of data recorded by the second write, even if the first write operation occurred when the transducer 20 was not completely settled and was therefore off-track. Shortening the settle window period improves disk drive performance in response to write commands where disk sectors corresponding to a data segment 72 to be recorded, are on the same track 62 (i.e. within-track replication) or on adjacent tracks 62 (i.e., adjacent-track replication).

According to another aspect of the present invention, to increase the capacity of the disk 22, the processor 82 can write data on the disk 22 in parallel tracks 62 wherein the distance between adjacent tracks 62 is reduced to levels at which data can be recorded at an acceptable adjacent-track overwrite rate. As such, inter-track density is decreased to levels that would cause the transducer 28 to overwrite data in tracks adjacent to a target track at rates that are unacceptable for disk drives without data replication. The increase in said overwrite rate is due to the reduction in distance between adjacent tracks. In disk drives without data replication, data lost in such overwrites cannot be recovered. However, in a disk drive according to the present invention, data lost due to such over-writes can be recovered from a replica. As such the capacity of the disk 22 is increased without loss of data segments thereon.

Further, as shown in FIG. 2, the present invention also provides for formatting the disk 22 such that only a dedicated portion 27 of the disk 22, or selected tracks or cylinders of the disk 22 are utilized for multiple copy storage of data segments thereon. As such, the remaining portions 25 of the disk 22 can be used for single copy storage of data segments.

Although in the above description, access time was utilized in selecting a disk sector 64 for reading from or writing data to, in another aspect of the present invention, selecting a disk sector 64 for reading or writing data can be based on the "service time" associated with that disk sector 64. The service time includes the access time for positioning the transducer 28 over a disk sector 64, and the transfer time for reading data from the disk sector 64 into the data buffer 80 once the transducer 28 is positioned over the disk sector 64. In many disk drive systems, data transfer from outer tracks 62 proximate the periphery of the disk 22 is faster than that of inner tracks 62 proximate the center of the disk 22. This is because data is stored in outer tracks at higher density than in inner tracks. As such, there are instances where although access time to a first disk sector is shorter than that of a second disk sector, the total service time for the first disk sector is longer than that of the second disk sector. Therefore, in the embodiments of the present invention described above, the processor 82 can utilize service time in place of access time in satisfying read and/or write commands from the host.

The service time associated with each disk sector 64 can be calculated by the processor 82 by determining the access time to that disk sector 64, and determining the data transfer time from that disk sector 64 to the data buffer 80 based on the location of the track 62 on the disk 22 where that disk sector 64 resides. Typically data tracks 62 are grouped in a plurality of concentric zones on the surface of the disk 22. Each zone has a specific data transfer rate associated with data sectors 64 therein based on the radial location of the zone on the disk 22. The data transfer rate associated with each zone can be stored in a table for access by the processor 82. The processor 82 utilizes the header 68 of a disk sector 64 to determine the track 62 and therefore the zone in which that disk sector 64 resides. The processor 82 then looks up the data transfer rate for that zone from said table to determine the data transfer rate for that data sector 64. The processor 82 then utilizes the data transfer rate to calculate the transfer time for the amount of data to be transferred between the disk sector 64 and the data buffer 80. The data transfer time is then added to the access time to determine the service time for that disk sector 64. The processor 82 then compares the service times for disk sectors associated with a data segment to select a disk sector with the shortest service time for data transfer.

The present invention fully contemplates storing a data segment in more than two regions on the recording media. As such, copies of a data segment can be replicated in n regions on the recording media, wherein n is an integer greater than 1. For example, copies of a data segment can be stored in 2, 3, 4, or more regions on the recording media as desired. Further, the present invention is fully applicable to other storage media such as CD ROMS and tape drives, for example, and is not limited to disk drives.

Although the present invention has been described in considerable detail with regard to the preferred versions thereof, other versions are possible. Therefore, the appended claims should not be limited to the descriptions of the preferred versions contained herein.

What is claimed is:

1. A data recording device for storing a plurality of data segments therein, the data recording device comprising:
   (a) recording media, having a set of at least two alternate regions thereon for each data segment;
   (b) a transducer positionable to write data on and read data from the recording media;
   (c) a controller for recording one or more data segments on the recording media in response to one or more write commands, the controller including:

a selector wherein for each of said one or more data segments the selector selects one region from the set of alternate regions corresponding to that data segment and positions the transducer to write that data segment on the selected region; and indicator for maintaining information identifying the relative order of recording each data segment on a region selected from the set of alternate regions corresponding to that data segment.

2. The data recording device of claim 1, wherein the selector selects said one region from said set of alternate regions based on a shortest time required to access each of the regions in said set of alternate regions.

3. The data recording device of claim 2, wherein the selector selects said one region from said set of alternate regions based on a shortest time required to access and record data on each of the regions in said set of alternate regions.

4. The data recording device of claim 1, wherein:
(a) the recording media comprises at least a first and a second data disk having recording surfaces thereon; and
(b) a first region of the set of alternate regions corresponding to at least one data segment includes a portion of a recording surface of the first data disk, and a second region of the set of alternate regions corresponding to said at least one data segment includes a portion of a recording surface of the second data disk.

5. The data recording device of claim 1, wherein data is recorded on the recording media in parallel tracks that repetitively pass the transducer means.

6. The data recording device of claim 5, wherein each region of the set of alternate regions corresponding to at least one data segment is on a different track on the recording media.

7. The data recording device of claim 6, wherein the regions of the set of alternate regions corresponding to said at least one data segment are angularly spaced on the recording media.

8. The data recording device of claim 5, wherein the regions of the set of alternate regions corresponding to said at least one data segment are on the same track on the recording media.

9. The data recording device of claim 8, wherein data written in the regions of the set of alternate regions corresponding to said at least one data segment are about 180 degrees out of phase.

10. The data recording device of claim 1 further comprising a formatter for formatting the recording media to designate a portion of the recording media for said sets of alternate regions.

11. The data recording device of claim 1, wherein the indicator information includes chronological information identifying the relative order of recording each data segment on a region selected from the set of alternate regions corresponding to that data segment.

12. The data recording device of claim 11, wherein for each data segment the indicator records chronological information on the region selected from the set of alternate regions corresponding to that data segment for identifying the relative order of recording that data segment therein.

13. The data recording device of claim 12, wherein said chronological information comprises a time stamp.

14. The data recording device of claim 12, wherein said chronological information comprises a monotonic count.

15. The data recording device of claim 11, wherein the controller further includes a retriever for retrieving a data segment recorded on the recording media by: (a) examining said chronological information for each region of the set of alternate regions corresponding to that data segment to locate a region therein which stores a most recent recording of the data segment, and (b) accessing the located region to retrieve the data segment therefrom.

16. The data recording device of claim 1, wherein the controller further includes a replicator for positioning the transducer to write each data segment of said one or more data segments on at least one other region of said set of alternate regions corresponding to that data segment in addition to said selected region.

17. The data recording device of claim 16, wherein the controller further includes a retriever for retrieving a data segment recorded on the recording media by selectively accessing one region from the set of alternate regions corresponding to that data segment, wherein said one region requires shortest time to access.

18. The data recording device of claim 16, wherein the controller further includes a retriever for retrieving a data segment recorded on the recording media by selectively accessing one region from the set of alternate regions corresponding to that data segment, wherein said one region requires a shortest time to access and to read data therefrom.

19. A data recording device for storing a plurality of data segments therein, the data recording device comprising:
(a) recording media;
(b) a transducer positionable to write data on and read data from the recording media; and
(c) a controller for positioning the transducing means over the recording media for writing data to and reading data from the recording media, the controller including:
(1) a replicator for recording data segments on the recording media a multiplicity of times, wherein in response to a command to write a data segment on the recording media, the replicator records the data segment on the recording media a multiplicity of times at corresponding out of phase regions in a designated order, whereby data recorded in a first region first in said order contains a most recent copy of that data segment; and
(2) a retriever for retrieving data segments recorded on the recording media, wherein in response to a command to read a data segment written on the recording media a multiplicity of times, in a first mode of operation the retriever selectively accesses one of said corresponding out of phase regions requiring a shortest time to access, and in a second, alternative mode of operation the retriever selectively accesses said first region of the out of phase regions to read data therefrom.

20. The data recording device of claim 19 further comprising a verifier for verifying that for at least one data segment, data in said first region of the set of out of phase regions corresponding to said at least one data segment is consistent with data in one or more remaining regions of said set of out of phase regions.

21. The data recording device of claim 20, wherein the verifier verifies consistency of data in regions of said set of out of phase regions by: (a) reading data from said first region of the set of out of phase regions via the transducer and (b) reading data from one or more remaining regions of said set of out of phase regions via the transducer and comparing data read from each of said remaining regions to data read from said first region.

22. The data recording device of claim 21 further comprising and updater, wherein if data in one or more of said remaining regions is inconsistent with data in said first region, the updater updates the data in the one or more of said remaining regions with data from said first region.

23. The data recording device of claim 20, wherein the retriever operates in said first mode in response to a command to read a data segment when data in said first region and said one or more remaining regions is consistent, whereby the retriever selectively accesses a region among the first region and said one or more remaining regions which requires shortest time to access.

24. The data recording device of claim 23, wherein the retriever selectively accesses a region among the first region and said one or more remaining regions which requires shortest time to access and to read data therefrom.

25. The data recording device of claim 20, wherein the retriever operates in the second mode in response to a command to read a data segment when data in said first region of the set of out of phase regions corresponding to that data segment is inconsistent with data in at least one other region of said set of out of phase regions.

26. The data recording device of claim 20 further comprising a detector for detecting that recording a set of one or more data segments a multiplicity of times at out of phase regions is complete and for storing indicator information indicating said completion for the set of data segments.

27. The data recording device of claim 26, wherein said verifier performs the verification steps for the set of data segments only if said indicator information is not stored.

28. The data recording device of claim 27, wherein the replicator removes said indicator information when performing a write to the recording media for one or more data segments of said set of data segments.

29. The data recording device of claim 19, wherein in said first mode of operation the retriever selectively accesses one of said corresponding out of phase regions requiring a shortest time to access and to read data therefrom.

30. A data recording device for storing a plurality of data segments therein, the data recording device comprising:
   (a) recording media;
   (b) a transducer positionable to write data on and read data from the recording media;
   (c) a controller for positioning the transducer over the recording media for writing data to or reading data from the recording media, the controller including a replicator, wherein in response to a command to write a data segment on the recording media the replicator records the data segment on the recording media a multiplicity of times at out of phase regions corresponding to the data segment; and
   (d) indicator for maintaining chronological information for each data segment in response to each write command for each data segment, wherein the chronological information for a data segment identifies a unique time of recording the data segment on the recording media a multiplicity of times in response to each of said write commands for the data segment.

31. The data recording device of claim 30, wherein said chronological information comprises a time stamp.

32. The data recording device of claim 30, wherein said chronological information comprises a monotonic count.

33. The data recording device of claim 30, wherein the controller further includes a retriever, wherein in response to a command to read a data segment recorded on the recording media in out of phase regions corresponding to the data segment, the retriever selectively accesses one of said out of phase regions requiring shortest time to access.

34. The data recording device of claim 33 further comprising a verifier for verifying that for each data segment the chronological information for data in two or more of out of phase regions corresponding to that data segment is the same.

35. The data recording device of claim 34 further comprising an updater responsive to the verifier, wherein if data in two or more of said out of phase regions corresponding to that data segment is inconsistent with one anther, the updater utilizes the chronological information to locate one of said out of phase regions with a most recent copy of the data segment and updates data in remaining regions of the out of phase regions with the most recent copy of the data.

36. The data recording device of claim 34, wherein the verifier further stores indicator information indicating data consistency among said two or more out of phase regions.

37. The data recording device of claim 36, wherein said verifier performs the verification steps for one or more data segments only if said indicator information for the data segments is not stored.

38. The data recording device of claim 37, wherein the replicator removes said indicator information when performing a write to the recording media for a data segment.

39. The data recording device of claim 38, wherein if the indicator information is stored, in response to said read command the retriever utilizes said indicator information to selectively access one region among said two or more out of phase regions with consistent data corresponding to that data segment requiring shortest access time to read data therefrom.

40. The data recording device of claim 39, wherein if the indicator information is not stored, in response to said read command the retriever utilizes said chronological information corresponding to that data segment to access one of the corresponding out of phase regions with a most recent copy of the data segment to read data therefrom.

41. The data recording device of claim 33, wherein the retriever selectively accesses one of said out of phase regions requiring shortest time to access and to read data therefrom.

42. A data recording device for storing a plurality of data segments therein, the data recording device comprising:
   (a) recording media;
   (b) a transducer positionable to write data on and read data from the recording media;
   (c) a controller for positioning the transducing means over the recording media for writing data to or reading data from the recording media, the controller including a replicator, wherein in response to a command to write a data segment on the recording media the replicator records the data segment on the recording media a multiplicity of times at out of phase regions corresponding to that data segment; and
   (d) an indicator for maintaining inconsistency information for each data segment recorded on the recording media, wherein the inconsistency information for a data segment identifies regions among said corresponding out of phase regions which do not include identical copies of that data segment.

43. The data recording device of claim 42, wherein the inconsistency information further identifies a region among said out of phase regions storing the most recently recorded version of the data segment.

44. The data recording device of claim 43 further including an updater for examining said inconsistency information for at least ode data segment and for updating regions among said corresponding out of phase regions with said most recently recorded data.

45. The data recording device of claim 44, wherein the replicator\writes a subsequent version of a data segment to the recording media a multiplicity of times after the updater updates the corresponding out of phase regions for an immediately preceding version of the data segment.

46. The data recording device of claim 44, wherein the controller further includes a retriever, wherein in response to a read command for a data segment the the retriever accesses one region among the out of phase regions corresponding to that data segment, said one region requiring a shortest time to access.

47. The data recording device of claim 46, wherein the the retriever accesses said one region for reading data therefrom after the the updater updates two or more out of phase regions corresponding to that data segment, and wherein the retriever selects said one region from among said two or more updated out of phase regions.

48. The data recording device of claim 46, wherein the retriever accesses said one region requiring shortest time to access and to read data therefrom.

49. The data recording device of claim 42, wherein said indicator comprises non-volatile memory for storing said consistency information.

50. The data recording device of claim 42, wherein said consistency information is stored on the recording media.

51. A data recording device for storing a plurality of data segments therein, the data recording device comprising:
(a) recording media;
(b) a transducer positionable to write data on and read data from the recording media;
(c) a controller for positioning the transducer over the recording media for writing data to or reading data from the recording media, the controller including:
 (1) a replicator, wherein in response to a command to write a data segment on the recording media, the the replicator records the data segment on the recording media a multiplicity of times in multiple regions on the recording media corresponding to that data segment; and
 (2) indicator for maintaining information identifying the relative order of recording each data segment on a region selected from the set of alternate regions corresponding to that data segment, and
 (3) a retriever, wherein in response to a command to read a data segment written on the recording media a multiplicity of times, the retriever accesses one region of the multiple regions corresponding to the data segment to read data therefrom, and
  wherein if an error occurs in reading data from said one region of the multiple regions, the retriever accesses another region of the multiple regions to read data therefrom.

52. The data recording device of claim 51, wherein:
(a) the recording media comprises at least a first and a second data disk having recording surfaces thereon;
(b) the transducer includes a first transducer positionable over the first data disk, and a second transducer positionable over the second data disk; and
(c) for at least one data segment, a first region of said multiple regions corresponding to that data segment includes at least a portion of a recording surface of the first data disk, and a second region of said multiple regions includes at least a portion of a recording surface of the second data disk.

53. The data recording device of claim 51, wherein data is recorded on the recording media in parallel tracks that repetitively pass the transducer means.

54. The data recording device of claim 53 wherein data is recorded on the recording media in said parallel tracks such that the distance between adjacent tracks on the recording media is reduced to levels at which data can be recorded at an acceptable adjacent track overwrite rate.

55. The data recording device of claim 53 wherein data is recorded on the recording media such that a time for the transducing means to settle over a track on the recording media is reduced to levels at which data can be recorded at an acceptable adjacent track overwrite rate.

56. In a data recording device including recording media and transducing means positionable to write data on and read data from the recording media, a method for storing a plurality of data segments on the recording media, comprising the steps of:
(a) designating a set of at least two alternate regions on the recording media for each data segment, whereby each data segment has a corresponding set of at least two alternate regions on the recording media;
 in response to a write command for recording a data segment on the recording media, performing the steps of:
(b) selecting one region from the set of alternate regions corresponding to that data segment; and
(c) positioning the transducing means to write that data segment on the selected region; and
(d) maintaining information identifying the relative order of recording each data segment on a region selected from the set of alternate regions corresponding to that data segment.

57. The method of claim 56, wherein step (b) includes steps for selecting said one region from said set of alternate regions based on a shortest time required to access each of the regions in said set of alternate regions.

58. The method of claim 57, wherein step (b) includes steps for selecting said one region from said set of alternate regions based on a shortest time required to access and record data on each of the regions in said set of alternate regions.

59. The method of claim 56, wherein:
(a) the recording media comprises at least a first and a second data disk having recording surfaces thereon; and
(b) a first region of the set of alternate regions corresponding to at least one data segment includes a portion of a recording surface of the first data disk, and a second region of the set of alternate regions corresponding to said at least one data segment includes a portion of a recording surface of the second data disk.

60. The method of claim 56, wherein step (c) further includes recording data on the recording media in parallel tracks that repetitively pass the transducer means.

61. The method of claim 60 wherein step (a) further includes designating the regions of the set of alternate regions corresponding to said at least one data segment at angularly spaced locations on the recording media.

62. The method of claim 56 further including the steps of formatting the recording media to designate a portion of the recording media for said sets of alternate regions.

63. The method of claim 56, wherein in step (d) maintaining said information includes the steps of maintaining chronological information identifying the relative order of recording each data segment on a region selected from the set of alternate regions corresponding to that data segment.

64. The method of claim 63 wherein said chronological information comprises a time stamp.

65. The method of claim 63 wherein said chronological information comprises a monotonic count.

66. The method of claim 63 further including the steps of retrieving a data segment recorded on the recording media by steps including: (a) examining said chronological information for each region of the set of alternate regions corresponding to that data segment to locate a region therein which stores a most recent recording of the data segment, and (b) accessing the located region to retrieve the data segment therefrom.

67. The method of claim 56 further including the steps of positioning the transducing means to write each data segment of said one or more data segments on at least one other region of said set of alternate regions corresponding to that data segment in addition to said selected region.

68. The method of claim 67 further including the steps of retrieving a data segment recorded on the recording media by selectively accessing one region from the set of alternate regions corresponding to that data segment, wherein said one region requires shortest time to access.

69. The method of claim 67 wherein said one region requires shortest time to access and to read data therefrom.

70. In a data recording device including recording media and transducing means positionable to write data on and read data from the recording media, a method for storing a plurality of data segments on the recording media, comprising the steps of: positioning the transducing means over the recording media for writing data to and reading data from the recording media, by performing steps including: (a) in response to a command to write a data segment on the recording media, recording the data segment on the recording media a multiplicity of times at corresponding out of phase regions in a designated order, whereby data recorded in a first region first in said order contains a most recent copy of the data segment; and (b) in response to a command to read a data segment written on the recording media a multiplicity of times, in a first mode of operation selectively accessing one of said out of phase regions requiring a shortest time access, and in a second, alternative mode of operation selectively accessing said first region to read data therefrom.

71. The method of claim 70 further including the steps of verifying that for at least one data segment, data in said first region of the set of out of phase regions corresponding to said at least one data segment is consistent with data in one or more remaining regions of said set of out of phase regions.

72. The method of claim 71 further including the steps of verifying consistency of data in regions of said set of out of phase regions by steps including: (a) reading data from said first region of the set of out of phase regions via the transducer means and (b) reading data from one or more remaining regions of said set of out of phase regions via the transducer means and comparing data read from each of said remaining regions to data read from said first region.

73. The method of claim 72 further including the steps of: if data in one or more of said remaining regions is inconsistent with data in said first region, updating the data in said one or remaining regions with data from said first region.

74. The method of claim 71 further including the steps of: operating in said first mode in response to a command to read a data segment when data in said first region and said one or more remaining regions is consistent, and selectively accessing a region among the first region and said one or more remaining regions which requires shortest time to access.

75. The method of claim 74, wherein selectively accessing said one region includes accessing a region among the first region and said one or more remaining regions which requires shortest time to access and read data therefrom.

76. The method of claim 71 further including the steps of operating in the second mode in response to a command to read a data segment when data in said first region of the set of out of phase regions corresponding to that data segment is inconsistent with data in at least one other region of said set of out of phase regions.

77. The method of claim 71 further comprising the steps of detecting that recording a set of one or more data segments a multiplicity of times at out of phase regions is complete and storing indicator information indicating said completion for the set of data segments.

78. The method of claim 77 wherein the steps of verification includes performs the verification steps for the set of data segments only if said indicator information is not stored.

79. The method of claim 78 wherein the steps of replication includes removing said indicator information when performing a write to the recording media for one or more data segments of said set of data segments.

80. The method of claim 70 wherein selecting said one region in the first mode of operation includes selecting a region requiring a shortest time to access and to read data therefrom.

81. In a data recording device including recording media and transducing means positionable to write data on and read data from the recording media, a method of storing a plurality of data segments on the recording media, comprising the steps of: positioning the transducing means over the recording media for writing data to or reading data from the recording media by performing steps including: (a) in response to a command to write a data segment on the recording media, recording the data segment on the recording media a multiplicity of times at out of phase regions corresponding to the data segment; and (b) maintaining chronological information for each data segment in response to each write command for each data segment, wherein the chronological information for a data segment identifies a unique time of recording the data segment on the recording media a multiplicity of times in response to each of said write commands for the data segment.

82. The method of claim 81 further including the steps of recording said chronological information for each data segment in each region of the out of phase regions corresponding to the data segment.

83. The method of claim 82 wherein said chronological information comprises a time stamp.

84. The method of claim 82 wherein said chronological information comprises a monotonic count.

85. The method of claim 81 further including the steps of: in response to a command to read a data segment recorded on the recording media in out of phase regions corresponding to the data segment, selectively accessing one of said out of phase regions requiring shortest time to access.

86. The method of claim 85 further including the steps of verifying that for each data segment the chronological information for data in two or more of out of phase regions corresponding to that data segment is the same.

87. The method of claim 86 further including the steps of: if data in two or more of said out of phase regions corresponding to that data segment is inconsistent with one anther, utilizing the chronological information to locate one of said out of phase regions with a most recent copy of the data segment and updating data in remaining regions of the out of phase regions with the most recent copy of the data.

88. The method of claim 86 further including the steps of storing indicator information indicating data consistency among said two or more out of phase regions.

89. The method of claim 88 further including the steps of: performing the verification steps for one or more data segments only if said indicator information for the data segments is not stored.

90. The method of claim 89 further including the steps of removing said indicator information when performing a write to the recording media for a data segment.

91. The method of claim 90 further including the steps of: if the indicator information is stored, in response to said read command utilizing said indicator information to selectively access one region among said two or more out of phase regions with consistent data corresponding to that data segment requiring shortest time to access.

92. The method of claim 91 further including the steps of: if the indicator information is not stored, in response to said read command utilizing said chronological information corresponding to that data segment to access one of the corresponding out of phase regions with a most recent copy of the data segment to read data therefrom.

93. The method of claim 91 further including the steps of: in response to a command to read a data segment recorded on the recording media in out of phase regions corresponding to the data segment, selectively accessing one of said out of phase regions requiring shortest time to access and to read data therefrom.

94. In a data recording device including recording media and transducing means positionable to write data on and read data from the recording media, a method for storing a plurality of data segments on the recording media, comprising the steps of: (a) in response to a command to write a data segment on the recording media, positioning the transducing means over the recording media and recording the data segment on the recording media a multiplicity of times at out of phase regions corresponding to that data segment and (b) maintaining inconsistency information for each data segment recorded on the recording media, wherein the inconsistency information for a data segment identifies regions among said corresponding out of phase regions which do not include identical copies of that data segment.

95. The method of claim 94 wherein the inconsistency information further identifies a region among said out of phase regions storing the most recently recorded version of the data segment.

96. The method of claim 95 further including the steps of examining said inconsistency information for at least one data segment and updating regions among said corresponding out of phase regions with said most recently recorded data.

97. The method of claim 96 further including the steps of writing a subsequent version of a data segment to the recording media a multiplicity of times after updating the corresponding out of phase regions for an immediately preceding version of the data segment.

98. The method of claim 96 further including the steps of: in response to a read command for a data segment, accessing one region among the out of phase regions corresponding to that data segment, wherein said one region requires shortest time to access.

99. The method of claim 98 further including the steps of accessing said one region for reading data therefrom after updating two or more out of phase regions corresponding to that data segment, and selecting said one region from among said two or more updated out of phase regions.

100. The method of claim 98 wherein said one region requires shortest time to access and to read data therefrom.

101. In a data recording device including recording media and transducing means positionable to write data on and read data from the recording media, a method for storing a plurality of data segments on the recording media, comprising the steps of:

in response to a command to write a data segment on the recording media, positioning the transducing means over the recording media for recording the data segment on the recording media a multiplicity of times in multiple regions on the recording media corresponding to that data segment; and maintaining information identifying the relative order of recording each data segment on a region from the set of regions corresponding to that data segment; and in response to a command to read a data segment written on the recording media a multiplicity of times, positioning the transducing means over the recording media and accessing one region of the multiple regions corresponding to the data segment to read data therefrom, wherein if an error occurs in reading data from said one region of the multiple regions, the retrieval means accesses another region of the multiple regions to read data therefrom.

102. The method of claim 101, wherein:

(a) the recording media comprises at least a first and a second data disk having recording surfaces thereon;

(b) the transducer means includes a first transducer positionable over the first data disk, and a second transducer positionable over the second data disk; and (c) for at least one data segment, a first region of said multiple regions corresponding to that data segment includes at least a portion of a recording surface of the first data disk, and a second region of said multiple regions includes at least a portion of a recording surface of the second data disk.

103. The method of claim 101, wherein data is recorded on the recording media in parallel tracks that repetitively pass the transducer means.

104. The method of claim 103, wherein data is recorded on the recording media in said parallel tracks such that the distance between adjacent tracks on the recording media is reduced to levels at which data can be recorded at an acceptable adjacent track overwrite rate.

105. The method of claim 103, wherein data is recorded on the recording media such that a time for the transducing means to settle over a track on the recording media is reduced to levels at which data can be recorded at an acceptable adjacent track overwrite rate.

* * * * *